United States Patent [19]

Smith et al.

[11] 4,188,511
[45] Feb. 12, 1980

[54] MULTI-LINK TELEPHONE INTERCOM SYSTEM

[75] Inventors: Maurice I. Smith, Redmond; John D. Gillen, Kirkland; Gerald L. Edwards, Seattle, all of Wash.

[73] Assignee: Tone Commander Systems, Inc., Redmond, Wash.

[21] Appl. No.: 873,157

[22] Filed: Jan. 27, 1978

[51] Int. Cl.² ............................................. H04M 9/06
[52] U.S. Cl. .............................. 179/99 A; 179/99 M; 179/18 AD; 179/18 J; 179/37; 179/15 AT
[58] Field of Search ................. 179/99, 18 AD, 18 J, 179/37–40, 1 H, 1 HF, 84 B, 84 C, 84 L, 2 EB, 15 AL, 15 AT; 325/53, 55, 64

[56] References Cited

U.S. PATENT DOCUMENTS

| | | | |
|---|---|---|---|
| 2,275,352 | 3/1942 | Durante | 179/84 B |
| 3,385,935 | 5/1968 | Anderson et al. | 179/99 |
| 3,406,260 | 10/1968 | McEowen | 179/37 |
| 3,555,424 | 1/1971 | Malm | 325/53 |
| 3,573,379 | 4/1971 | Schmitz | 179/15 |
| 3,582,562 | 6/1971 | Sellari, Jr. | 179/18 AD |
| 3,670,108 | 6/1972 | Anderson | 179/18 J |
| 3,786,194 | 1/1974 | Pinede et al. | 179/18 AD |
| 3,809,824 | 5/1974 | Dahlquist | 179/37 |
| 3,872,262 | 3/1975 | Kerman | 179/99 |
| 3,909,551 | 9/1975 | Marshall | 179/99 |
| 3,935,396 | 1/1976 | Barsellotti et al. | 179/99 |
| 3,985,959 | 10/1976 | Kobine et al. | 179/2 DP |
| 4,009,354 | 2/1977 | Champan | 179/99 |
| 4,010,332 | 3/1977 | Matheny | 179/99 |
| 4,013,840 | 3/1977 | Anderson | 179/15 FD |
| 4,037,058 | 7/1977 | Stine | 179/99 |
| 4,037,059 | 7/1977 | Stine | 179/99 |
| 4,055,731 | 10/1977 | Angner et al. | 179/84 L |
| 4,136,263 | 1/1979 | Williams | 179/18 AD |

FOREIGN PATENT DOCUMENTS

| | | |
|---|---|---|
| 449436 | 6/1936 | United Kingdom . |
| 598120 | 2/1948 | United Kingdom . |
| 636138 | 4/1950 | United Kingdom . |
| 1173981 | 12/1969 | United Kingdom . |
| 1369460 | 10/1974 | United Kingdom . |
| 1410508 | 10/1975 | United Kingdom ............ 179/99 |

*Primary Examiner*—Gerald Brigance
*Attorney, Agent, or Firm*—Harry M. Cross, Jr.

[57] ABSTRACT

The system includes up to four communication links, a separate link selector for each link, and a separate link scanner for each telephone station. The system is suitable for usage with conventional dial pulse or tone selective key telephone sets.

20 Claims, 19 Drawing Figures

OFF HOOK BUSY

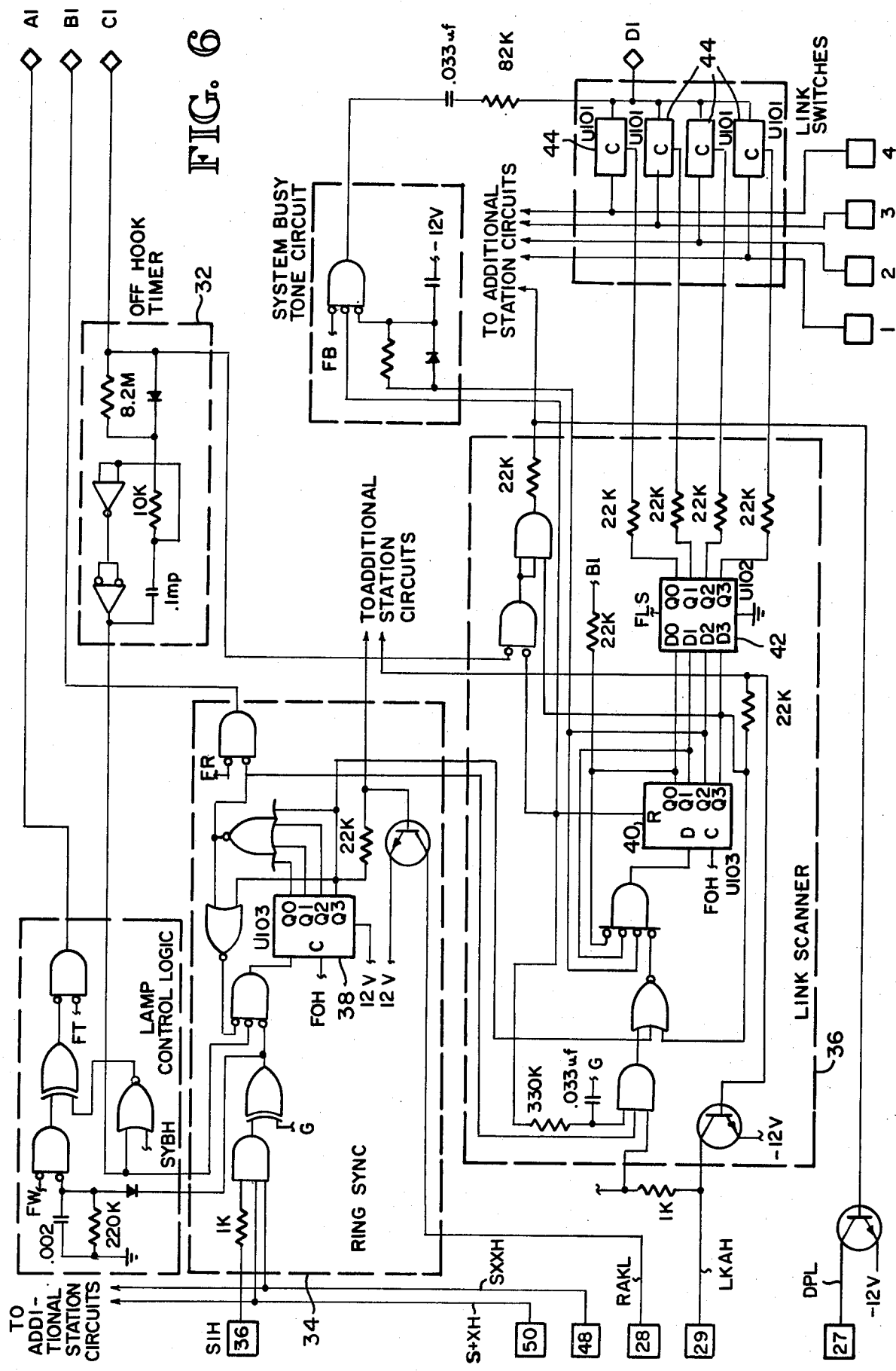

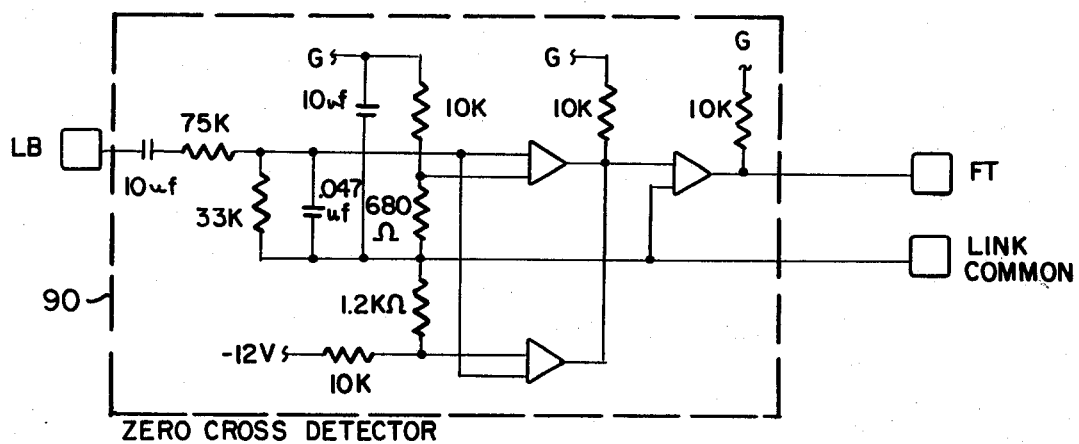
FIG. 12
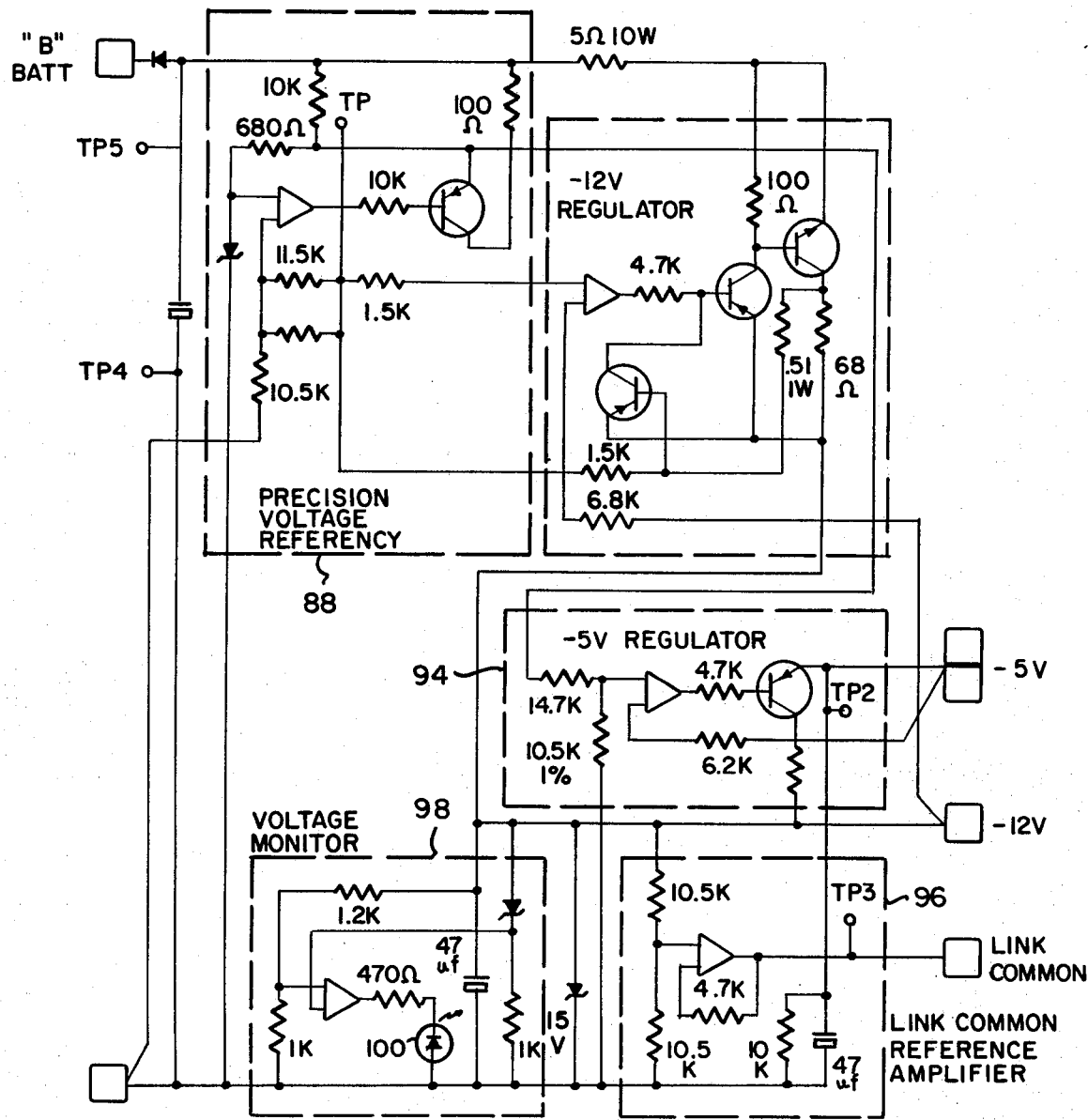

MULTI-LINK TELEPHONE INTERCOM SYSTEM

BACKGROUND OF THE INVENTION

This invention relates to multi-link telephone intercom systems and, more particularly, to multi-link intercom systems suitable for usage with conventional key telephone sets.

Multi-link telephone intercom systems provide a plurality of intercom links for effecting multiple conversation intercom service between a plurality of telephone stations serviced thereby. Each link constitutes a discrete two-way talking path along which two, three or more stations can communicate when simultaneously accessed thereto. Multi-link intercom systems typically are characterized by a common control which includes a single link selector for switching the subscriber stations to the links. The common control continuously monitors or scans the stations to determine when one subscriber station desires intercom service and, upon sensing or receiving appropriate control signals from a subscriber station indicative that intercom service is desired, the common control switches the link selector to that station and causes appropriate indications to appear at the remaining subscriber stations which indicate that the selector is in use. The link selector then searches for and seizes an available link, whereupon it receives station address information from the station to which it is switched and effects appropriate call indication at another subscriber station which, when taken off-hook, is accessed to the link to complete the talk path. The station desiring intercom service is sometimes referred to hereinafter as the "calling station" and the station at which call indication is effected is sometimes referred to hereinafter as the "called station".

In most practical multi-link telephone intercom systems, therefore, the principal control and link switching functions are concentrated in the common control and specialized equipment is required to provide communication between the subscriber stations and the link selector; however, the station circuits associated with each telephone station are, by comparison with the common control, much simpler and hence less costly. Consequently, these systems tend to be uneconomical in small intercom (e.g. 20 or fewer stations) applications due to the disproportionately high cost of common control versus station costs. Further, since line concentration by space division network, relay matrix or appropriate hard wire connections, is employed to transmit signals, typically in digital format, from the calling station to the common control, special telephone sets must be used at the subscriber stations, each set including only one talk path appearance or one pair of talk path conductors along with a second pair of conductors which act to transmit the digital control signals. These systems therefore cannot be used with conventional key telephone sets in which a dedicated talk path pair is associated with each station appearance and which transmit station address information in the form of tone or dial pulse signals along an accessed intercom talk path.

SUMMARY OF THE INVENTION

This invention overcomes or substantially mitigates these and other problems associated with multi-link intercom systems by providing a separate link selector for each link and a separate link scanner for each subscriber station. The calling station link scanner searches for and seizes an available link, whereupon the link selector assigned to that link, upon receipt of station address information transmitted from the calling station, causes the called station link scanner to connect the called station telephone set to the seized link, thereby establishing a private two-way, talk path between the stations. Among the additional communication functions affordable by the system are: conferencing; system busy indication; camp-on, with station call-waiting indication at the called station; paging access; outside line access; and optional off-hook busy operation whereby non-audible call indication will occur with the called station telephone set off-hook.

According to one preferred embodiment of the invention, signals are transmitted between the link scanners and the link selectors in time division multiplexed form. Each link is assigned a discrete time slot which is identifiable by a ring synchronizer associated with each link scanner to determine the link on which the station is being called (or the link previously seized by the calling station). Another aspect of this embodiment is that station address information in dial pulse or dual-tone multi-frequency (DTMF) format is transmittable from the calling station to the link selector assigned to the seized link along the audio path established thereby.

As will be appreciated from the foregoing summary, by providing a separate link scanner for each station, link scanning and control are, in the present invention, distributed among the station circuits so that small intercom systems equipped with this invention are not penalized by disproportionate common control costs. As the number of stations is increased, of course, the proportionate share of the total system costs will shift in favor of station costs. Furthermore, the common control, by providing separate link selectors for each link, eliminates link switching; yet, using integrated circuit components, can be fabricated on an economical basis. Consequently, this invention offers unparalleled economy and versatility, especially as applied to small intercom systems. Additionally, according to the one preferred embodiment of the invention in which time division multiplex signal transmission is employed, it is possible to provide a highly simplified circuit structure which affords manufacturing and service economies and, by providing transmission of station address information along a seized link, conventional dial pulse or tone selective key telephone sets may be used.

These and other features, objects and advantages of the present invention will become apparent from the detailed description and claims to follow taken in conjunction with the accompanying drawings.

BRIEF DESCRIPTION OF THE DRAWINGS

FIGS. 5 and 6 together constitute an electrical schematic of one preferred station circuit;

FIG. 12 is an electrical schematic of one preferred FIG. 4 power supply circuit;

DETAILED DESCRIPTION OF THE DRAWINGS

Figure 1:
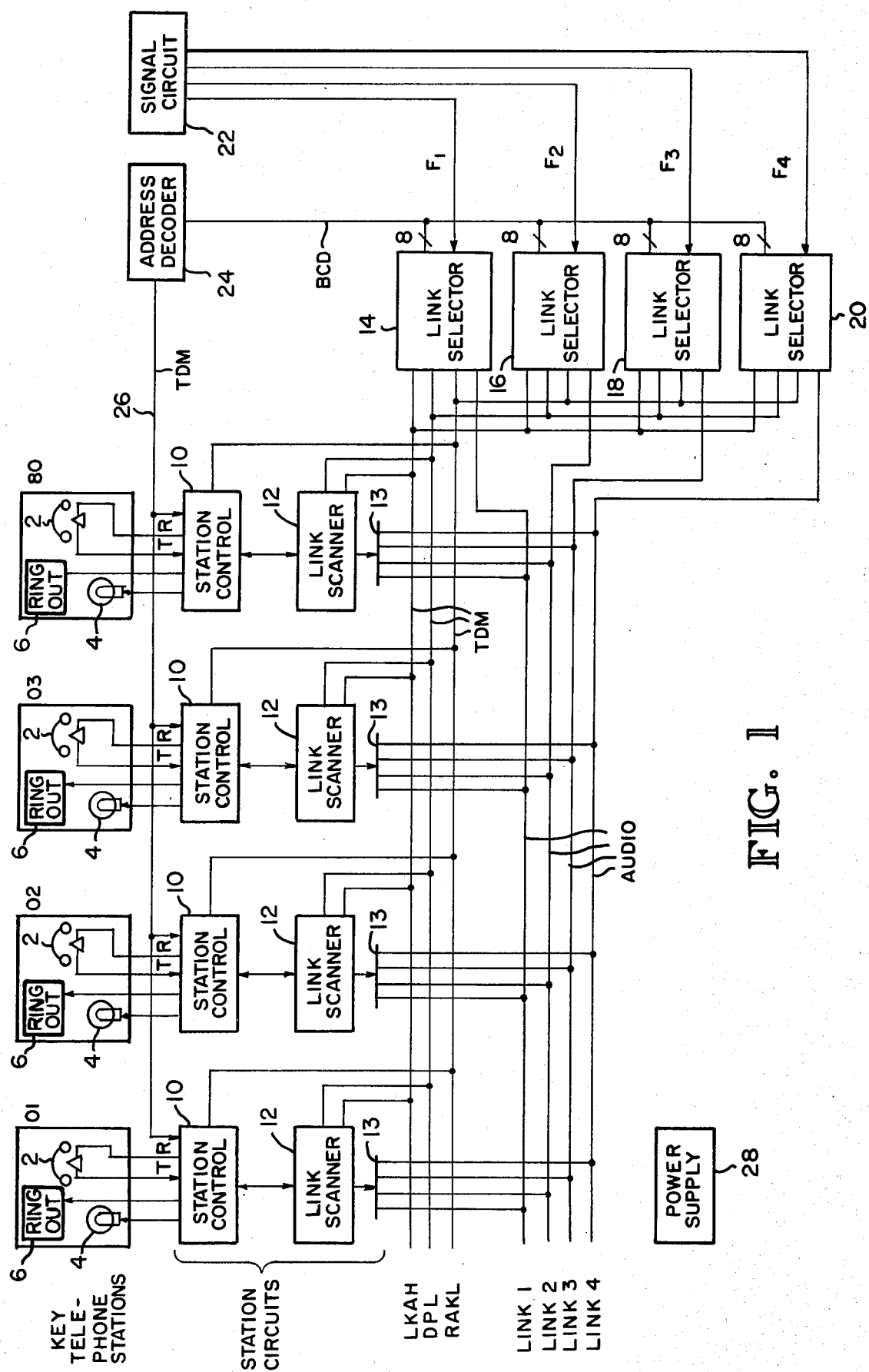
FIG. 1 is a block diagram of the multi-link telephone intercom system according to this invention.

The FIG. 1 system is comprised of up to four communication links (referenced LINK 1–LINK 4), each adapted to provide a discrete two-way talk path. In the illustrated example, the system is employed with 80 telephone stations (only four illustrated), each equipped with a conventional key telephone set 2, a lamp 4 and a ring-out device 6. According to this invention, a separate station circuit including a station control 10, a link scanner 12 and link switch 13 is associated with each station—80 station circuits being provided in the FIG. 1 system. Each control 10 is connected to the station telephone set 2 by conventional tip and ring terminations T and R. A separate link selector circuit is associated with each link, four link selector circuits (referenced 14, 16, 18, and 20) being connected with links LINK 1–LINK 4, respectively. Common control buses LKAH, RAKH and DPL connect all link scanners and link selectors and are impressed with correspondingly referenced time division multiplexed (TDM) control signals. A signal circuit 22 produces four TDM timing signals $F_1$–$F_4$ (see FIG. 13) which are routed to the link selectors 14, 16, 18 and 20, respectively; to define four TDM time slots which correspond to and serve to identify links LINK 1–LINK 4. An address decoder receives and decodes BCD signals which appear at the outputs of selectors 14, 16, 18, 20 and routes a TDM station address signal via station address bus 26 to all station control circuits 10. A power supply 28 provides power at selected operating voltages for operating the system. Preferred electrical circuits which make up the FIG. 1 system are illustrated in further detail hereinafter, although other circuits could be used, provided they perform the functions hereinafter described.

In brief, the FIG. 1 system operates as follows. When a calling station assumes off-hook status, its station control detects and verifies that a valid off-hook condition exists on the basis of the electrical signals which appear at the tip-ring terminations T and R. In the event a valid off-hook condition exists, the link scanner circuit associated with that station caused the station set lamp to light steadily and commences searching for an available link by scanning the TDM control signal present on bus LKAH to identify which, if any, of the four TDM time slots defined by timing signals $F_1$–$F_4$ exhibit a binary logic signal indicative of link availability. In the event one time slot is identified as link available, the link scanner seizes the corresponding link by applying a second binary logic signal indicative of link seizure to bus LKAH in that time slot. The link selector dedicated to the now seized link detects seizure thereof and causes dial tone to be transmitted back to the calling station telephone set. The calling station telephone set now may be operated in the customary key telephone manner whereby the address of the called station is "dialed" by operating a rotary dial or a push button key pad to produce dial pulse or dual-tone multi-frequency (DTMF) signals, as the case may be. The preferred link selector is capable of decoding both types of signals to produce a decoded BCD output signal indicative of the called station address. This signal is routed to the address decoder 24 which identifies the link selector from which that signal originated and thereupon transmits a station address signal to all station control circuits. This signal is composed of station address data which uniquely corresponds to the called station address and which appears in the TDM time slot corresponding to the link selector identified. The station control circuit associated with the called station, and no other station, will respond to the station address data in the event the calling station is in a call acceptance mode (e.g. on-hook) by synchronizing with that signal and identifying the link on which the incoming call is present by determining in which TDM time slot the station address data appears. The called station control thereupon initiates ring-out and flashing lamp indication at the called station telephone set, and applies a binary logic signal indicative of ring acknowledgement to bus RAKH in the TDM time corresponding to the identified seized link. The link selector associated with the seized link now responds to the RAKH signal applied by the called station control by causing a ring back signal to be transmitted back to the calling station telephone set along that link. When the called station telephone set assumes off-hook status, the called station link scanner operates the called station link switch 13 to connect the called station telephone set with the now identified seized link, the ring back signal is removed, and the two stations are simultaneously accessed to the same link. Ring-out at the called station now is terminated while both station lamps remain on steadily. Among the additional communication functions provided by the FIG. 1 system are:

CONFERENCE CALLING—While carrying on an established conversation, and a third party is to be brought in, flash switch hook (50–200ms) to recover dial tone. The original call will be maintained, and the third party is then dialed. When the third party answers a three way conversation is then established. This procedure can be repeated for any number of stations to be brought into conference. If the party to be added does not answer or station is busy, original conversation can be restored by flashing switch hook (50–200ms) and audible ring back or busy tone is eliminated. Any station may leave the conference without affecting the conversation of the other stations.

SYSTEM BUSY—If all equipped links are busy, then the station lamps will light steadily, and no other calls can be made. Any station coming off-hook during this condition will receive a busy tone; but there will be no disruption to already established conversations.

CAMP-ON—When a called station is busy (on intercom) the calling party will hear a busy tone. The camp-on feature will notify the called party of an intercom call waiting by flashing the intercom lamp. The audible ringing will not be transmitted to the called station, however, eliminating the ringing disturbance. This status will be maintained until either the calling party or the called party hangs up. If the calling party hangs up, the call is terminated. When the called party hangs up, the calling party will have the busy tone replaced with ring back and audible ringing will begin at the called station. A maximum of three calling parties can be camped on to one called station.

CALL WAITING INDICATOR—Call waiting is a partial function of camp-on and is indicated by flashing lamp at a called station.

Figure 7:
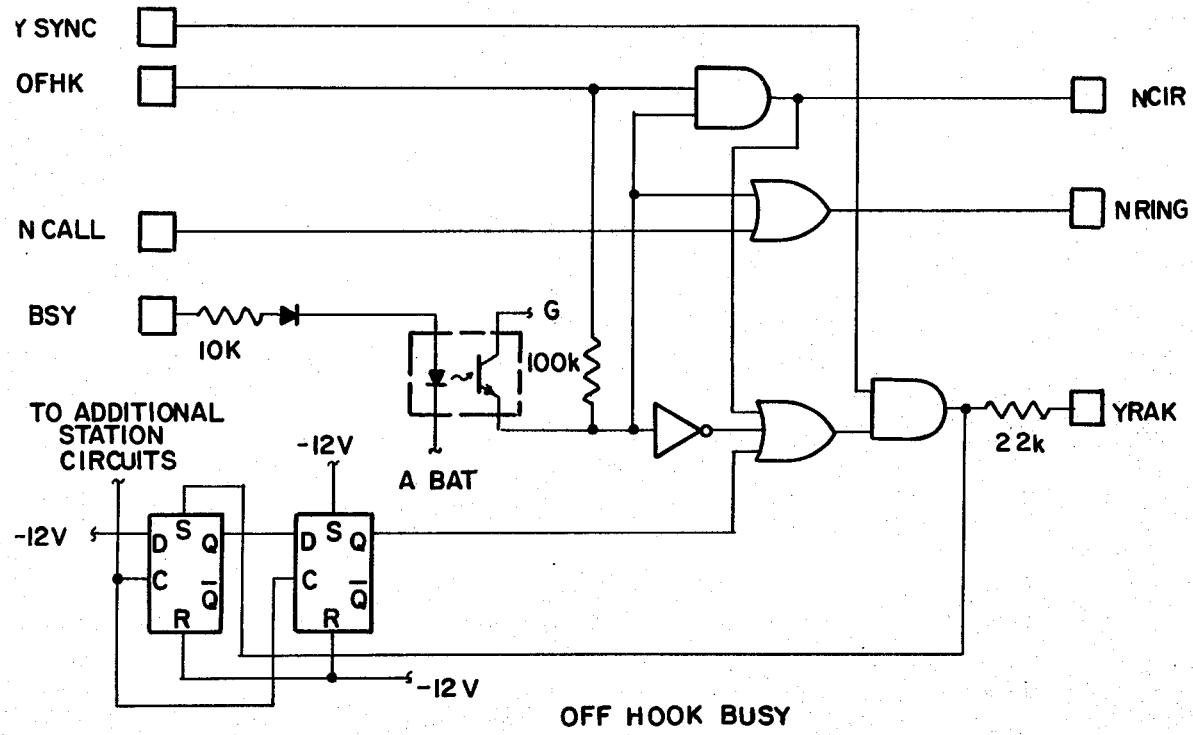
FIG. 7 is an electrical schematic of one preferred FIG. 2 off-hook busy circuit.

OFF-HOOK BUSY—The FIG. 7 off-hook busy circuit basically expands camp-on to include all CO, FEX, etc., lines on the key telephone. A busy tone will be returned to the intercom calling party regardless of what line the called party is on. The called party will be notified of an intercom call waiting by the intercom line lamp flashing, no audible ringing will occur and, as a consequence, it is possible to eliminate the disturbance of audible ringing while a station is busy on a line other than the intercom. When the called party hangs up, the connection will be completed and audible ringing will commence.

UNEQUIPPED STATION CODE CALLING—If a call is made to an invalid station code (a station not equipped with a station circuit) a busy tone will be returned to the calling party. Likewise, each link scanner is prevented from seizing a link not equipped with a link selector circuit.

Figure 14:
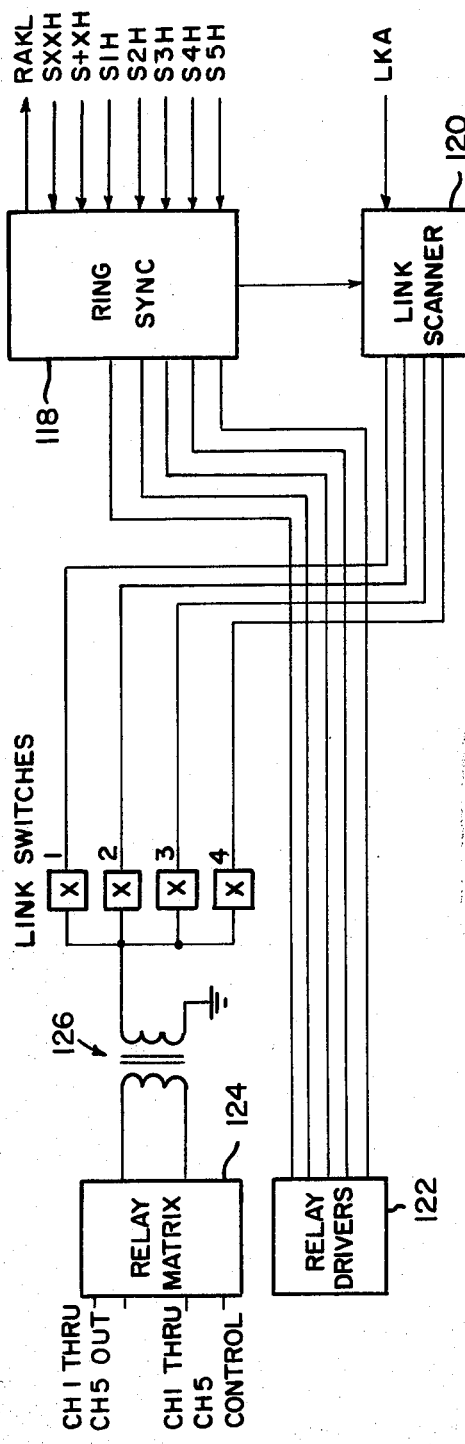
FIG. 14 is a block diagram of a paging access circuit for the FIG. 1 system.

PAGING ACCESS—The FIG. 14 paging access circuit provides dial selective access to five paging zones. Each zone is provided a 600 ohm balanced audio pair and a dry contact closure which is operated upon dialing an assigned code. Flexibility permits external wiring to provide multiple zone paging.

Figure 15:
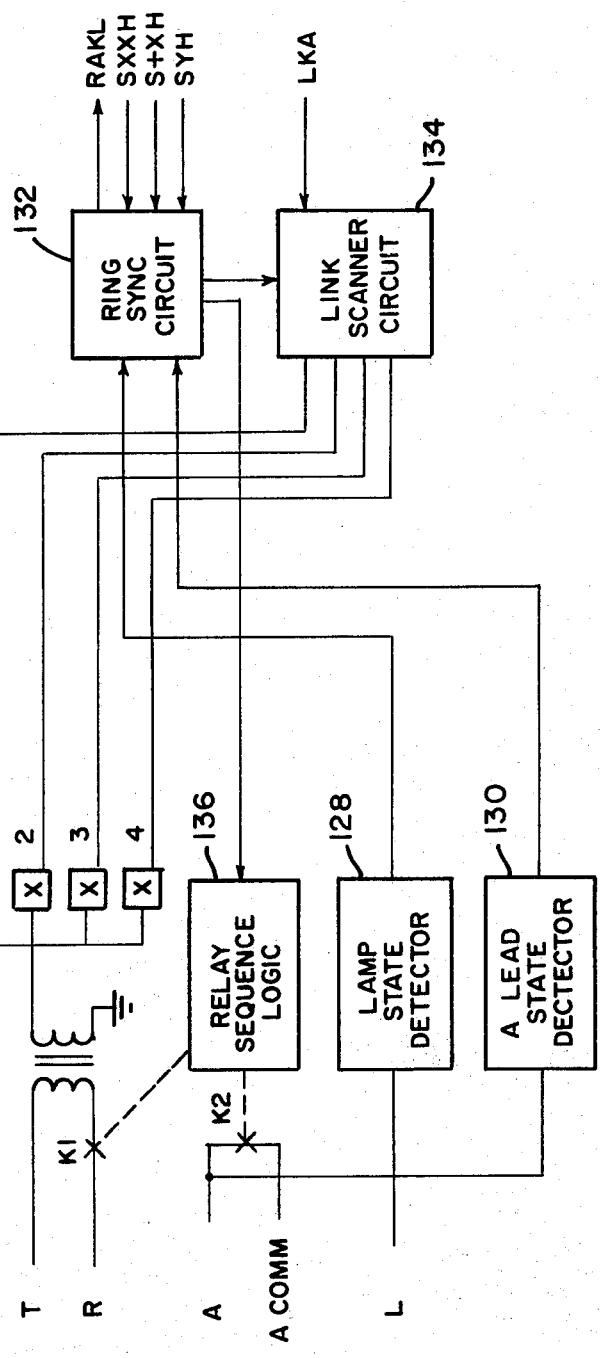
FIG. 15 is a block diagram of an outside line access circuit for the FIG. 1 system.
Figure 16A:
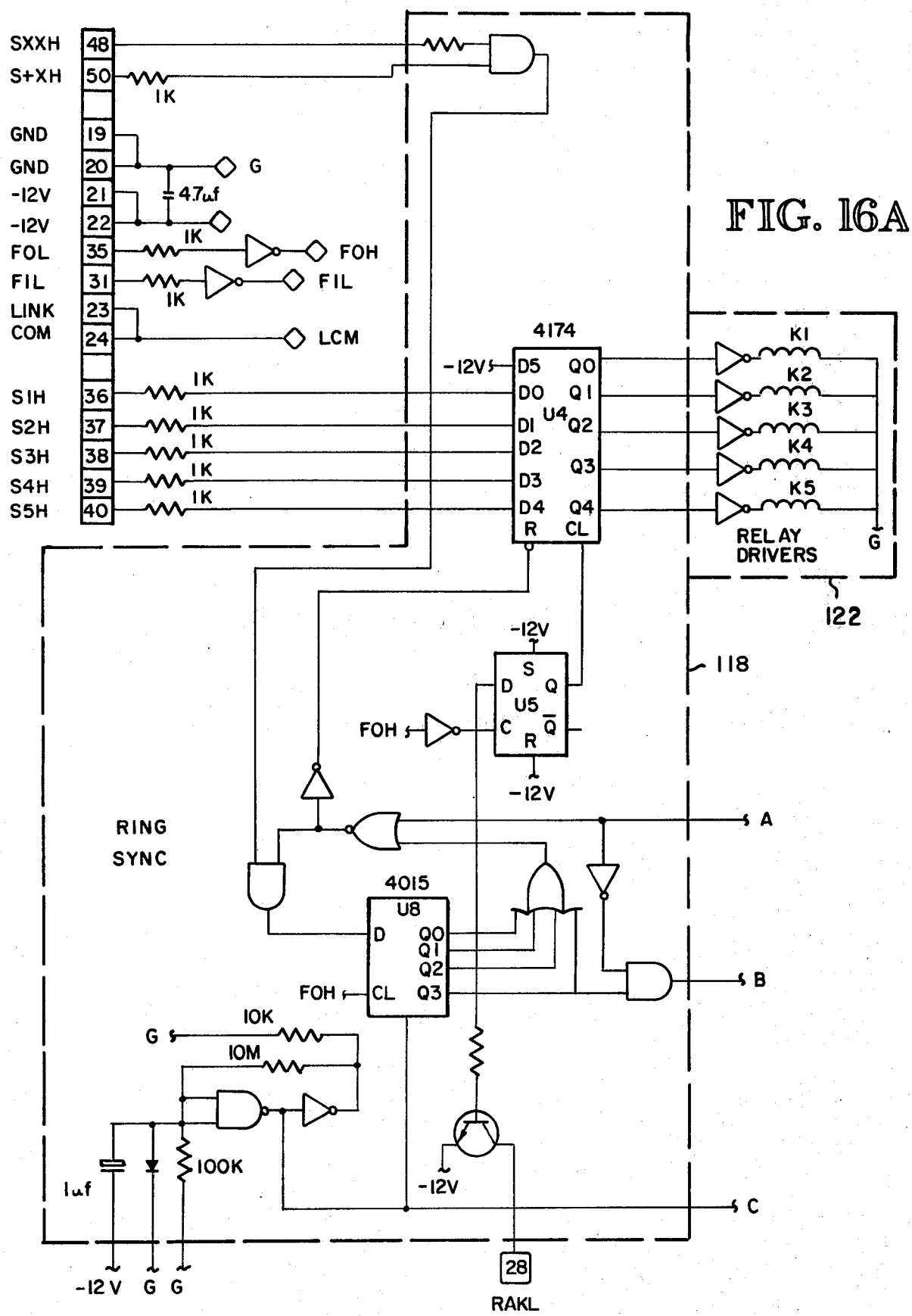
FIGS. 16A and 16B together constitute an electrical schematic of one preferred FIG. 14 circuit.
Figure 16B:
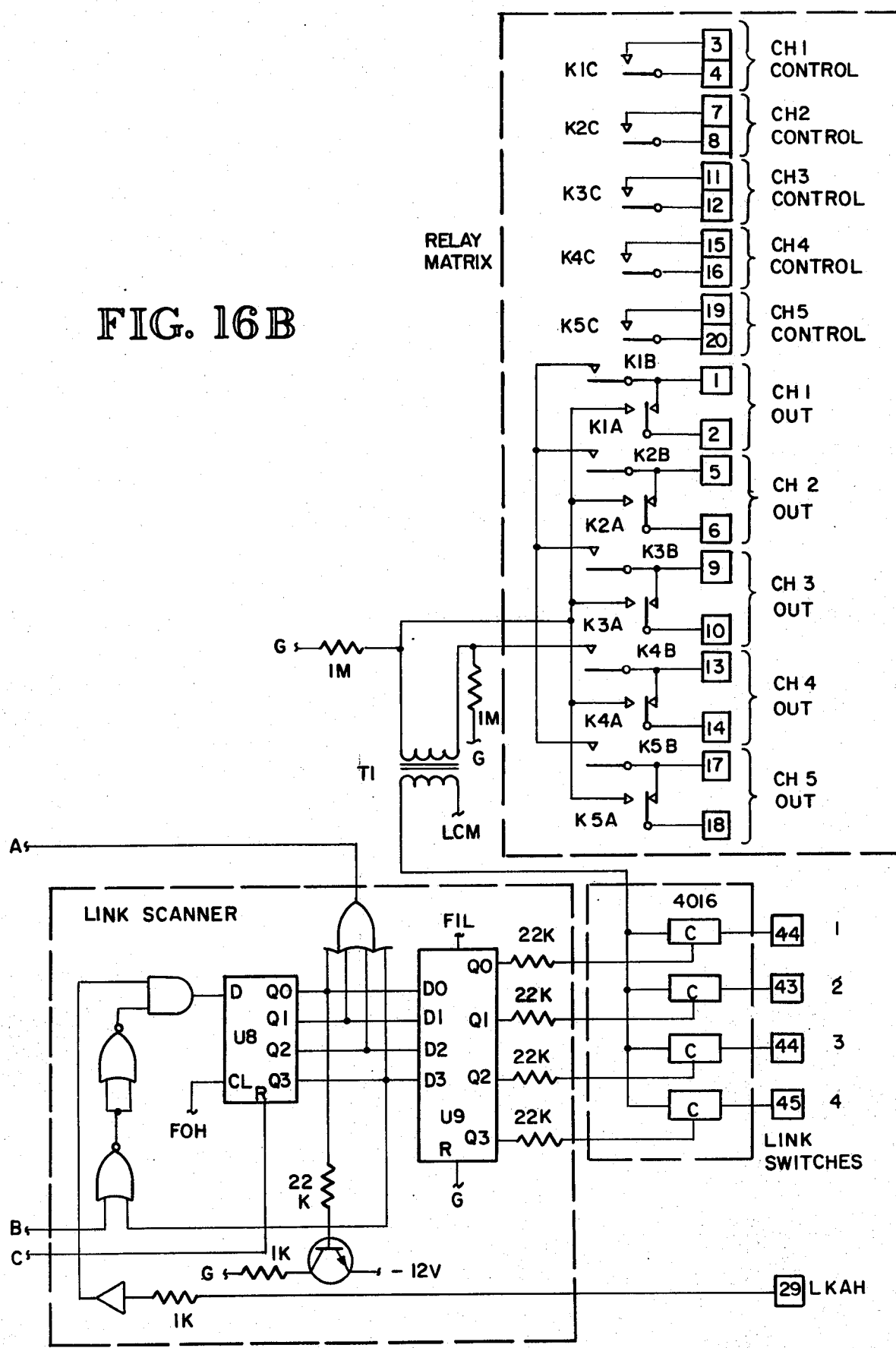
Figure 17:
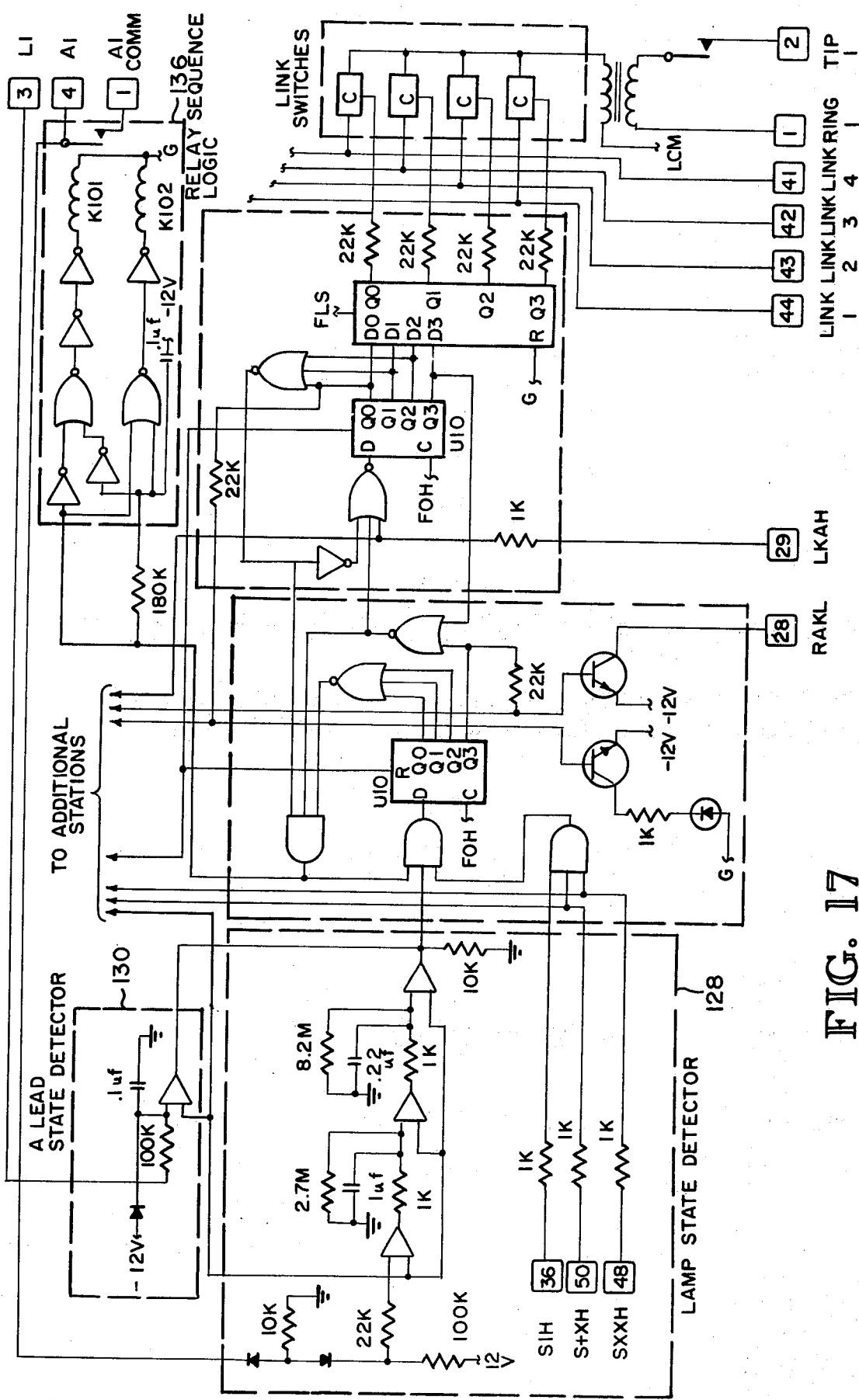
FIG. 17 is an electrical schematic of one preferred FIG. 15 circuit.

OUTSIDE LINE CONFERENCING—The FIG. 15 outside line access circuit permits an intercom station to access and pickup an outside CO line that is on hold by dialing an assigned dial code. Once an outside line has been accessed it will not be dropped until all parties on that intercom link have hung up. Preferably, dialing an outside line access code with the outside line in use or idle will result in busy tone being received by the calling station. The FIG. 15 circuit interfaces to the outside line key system line circuit, through the tip, ring, lamp, and 'A' leads via an A25B type connector cable.

Figure 2:
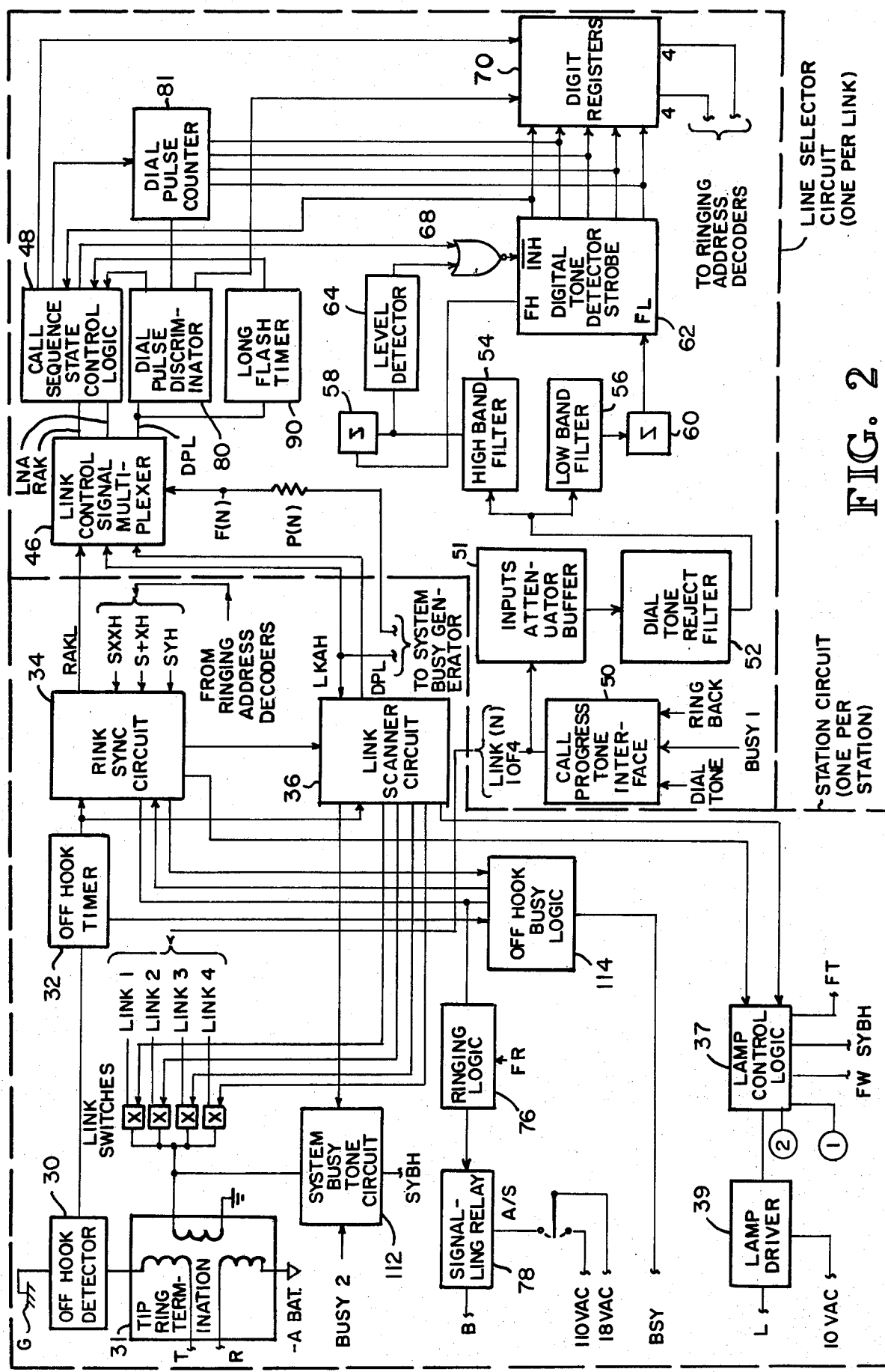
FIG. 2 is a block diagram of one FIG. 1 station circuit and one FIG. 1 link selector circuit.

The FIG. 1 system will now be described in further detail with reference to FIGS. 2, 5, 6, 7, 8A and 8B. FIG. 2 depicts one FIG. 1 station circuit and one FIG. 1 link selector circuit, it being understood that the remaining station and link selector circuits are identical. Referring first to FIG. 2, when the telephone set associated with the illustrated station circuit is taken off-hook, thereby placing the station set across the tip and ring terminals T and R, electrical current is caused to flow from ground, through an off-hook detector 30, through a tip-ring termination 31 and the station set to negative battery −A Bat. Detector 30 transmits a binary logic signal indicative of off-hook status of the associated station set to an off-hook timer 32 which imposes a delay upon further transmission of that signal for a time period sufficient to allow for contact bounce and false noise hits to dissipate in order to make the system insensitive to initial off-hook conditions and prevent validation of a false off-hook condition. In the event detector 30 continues to detect an off-hook condition at the end of that time period, timer 32 routes a signal indicative of the existence of a valid off-hook condition to a ring synchronization circuit 34 and to the link scanner circuit (referenced 36 in FIG. 2) of that station circuit. The ring synchronization circuit is now informed that the associated telephone set is off-hook or busy and, in the event an incoming call thereafter is directed to that station, the ring synchronization circuit will provide an appropriate busy indication to that incoming call, as will be described presently. FIG. 7 depicts preferred tip-ring termination and off-hook detector circuits, and FIG. 6 depicts preferred off-hook timer, ring synchronization and link scanner circuits.

Figure 13:
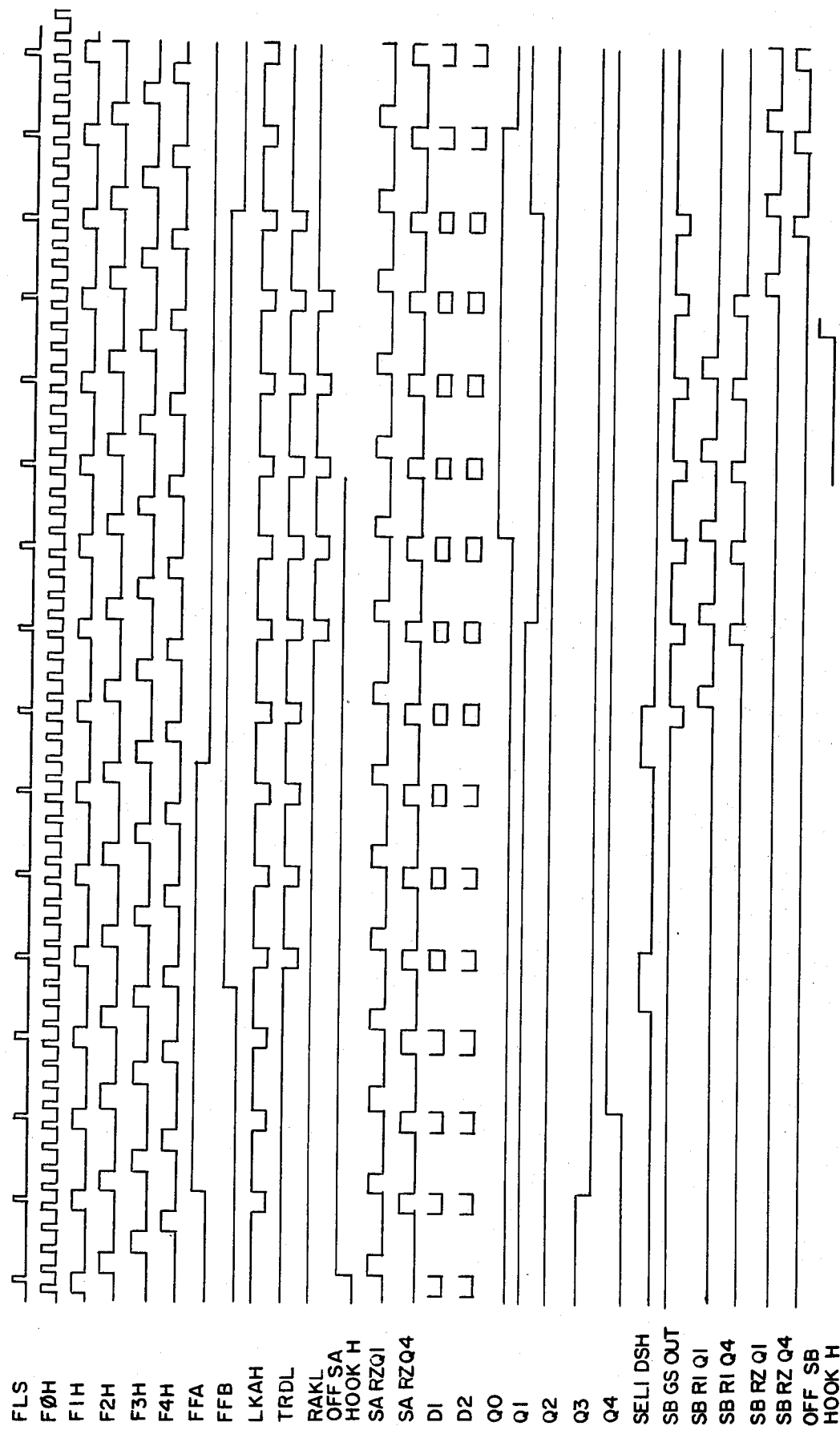
FIG. 13 is a timing diagram depicting operation of the FIG. 1 system.

The FIG. 2 link scanner circuit, in response to the signal received from the off-hook timer, now begins scanning for an available link which, in the example, is represented by the appearance of a high or logic 1 signal during a particular time slot defined by timing signals F1H-F4H as depicted in FIG. 13. For example, when the binary data signal which appears at pin 29 (FIG. 6) is high during the time slot associated with signal F1H, link 1 is available. Likewise, if the binary data signal which appears is low during the time slot associated with signal F1H, then link 1 is in use or has been seized. The link scanner circuit therefore reads the data present on the LKAH lead or at pin 29 (FIG. 6) and will seize the link which corresponds to the link available signal which first appears commencing after the link scan is initiated by applying a low signal to the LKAH lead or at pin 29 (FIG. 6) during the time slot which corresponds to the available link. Once a particular link has been seized by a station circuit in the manner just described, no other station circuit can seize that link until it is released by the seizing station circuit. Upon seizing a link, the calling station link scanner operates a lamp control logic 37 which, in turn, energizes a lamp driver 39 such that the calling station indicator lamp lights steadily.

Referring to FIG. 6, the link scanner circuit includes a 4-bit shift register 38 which reads the LKAH data present at pin 29. The output of ring synchronizer register 38 is loaded into 4-bit register 40 in the link scanner. Registers 38 and 40 are clocked by FIG. 13 signal FOH. The binary signals which appear at outputs Q0-Q3 of register 40 are routed to a 4-bit latch 42 which is clocked by FIG. 13 signal FLS. This signal occurs during and serves to mark each F1H signal such that the occurrances of high signals at the Q0-Q3 outputs of latch 42 may be correlated with respect to F1H and so correspond in time to the appearances of high data signals in the four TDM time slots associated with the LKAH control signal. The signals which appear at the Q0-Q3 outputs of latch 42 are applied to respective link switches which, in the illustrated system, are constituted by analog switches 44. The latch output signals are applied to the control inputs C of switches 44. Signals FLS and FOH are generated by the FIG. 1 signal circuit 22, as will be described in further detail hereinafter with reference to FIG. 3.

Referring again to FIG. 2, each link selector includes a link control signal demultiplexer 46, which receives and converts the data signal present on the LKAH bus to a level LKA in response to seizure of the associated link. Level LKA is routed to a call sequence state control logic circuit 48 which causes a dial tone signal to be applied to the talk path constituted by the seized link by operation of a call progress tone interface 50. The dial tone signal thus is fed back to the calling station telephone set along the talk path constituted by the seized link, whereupon the calling station may now initiate an appropriate dialing sequence, by push button or rotary dial operation, as the case may be. The DTMF tone or dial pulse signals generated during the calling sequence and representative of a called station address are transmitted from the calling station along the seized link talking path, as is customary in conventional key telephone intercom systems, and are decoded by the link selector circuit associated with that link, as will be described. A preferred control signal demultiplexer circuit and a preferred call sequence state control logic circuit are illustrated in FIG. 8A.

Figure 8A:
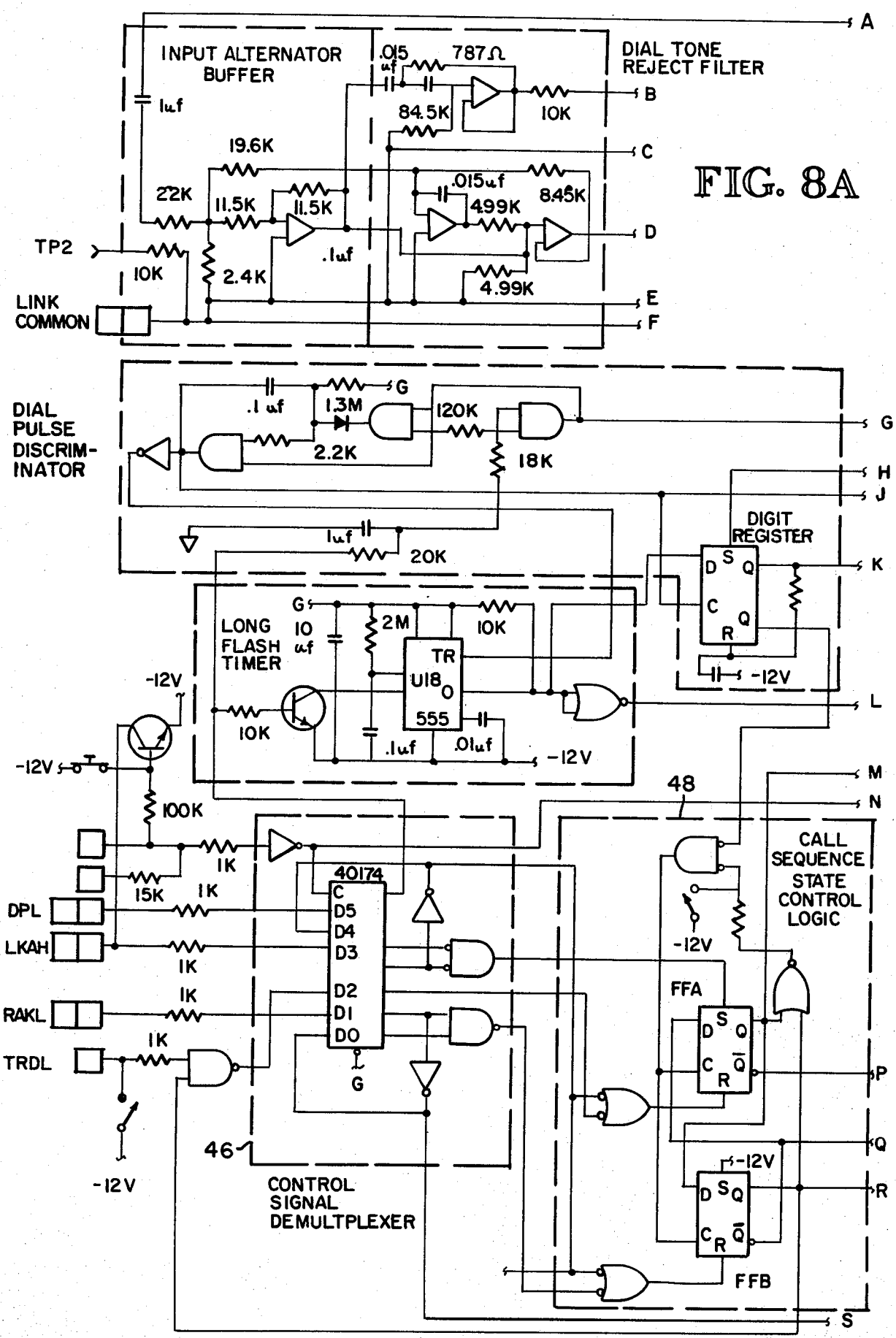
FIGS. 8A and 8B together constitute an electrical schematic of one preferred link selector circuit.

The preferred FIG. 8A call sequence state control logic circuit includes two flip-flops FFA and FFB which together provide four call sequence control logic states. These flip-flops are triggered in appropriate combinations during a call sequence such that the binary signals which appear at their outputs are representative of predetermined stages of each call sequence as depicted in FIG. 13. In the example, when the outputs of both flip-flops are low, the link selector circuit is idle; that is, the associated link is not in use, or a conversation is not in progress. The output of flip-flop FFA goes high while the output of flip-flop FFB remains low when a calling station initially seizes the link. This output condition is indicative that the link selector is awaiting receipt of signals corresponding to the first digit of a two decimal digit station address. Similarly, when the link selector circuit is awaiting receipt of the second digit of a two decimal digit station address, the output of flip-flop FFB goes high along with the output of flip-flop FFA. Under ringing conditions in which the called station is being rung, the output of flip-flop FFA is low while the output of flip-flop FFB is high. Thereafter, the output states of flip-flops FFA and FFB will remain in the last-mentioned output state until the calling station resumes on-hook status or a switch hook flash signal (described hereinafter) is received. Upon the occurrence of either condition, the outputs of both flip-flops again go low, corresponding to the idle state of the link selector circuit.

In the event the calling station is equipped with a push button telephone set, the signals transmitted from the calling station along the seized link LINK (N) are DTMF tones. These signals are presented to the input of an attenuator/buffer 51. The output of this circuit is transmitted via a dial tone reject filter 52 to a front-end band-split filter limiter circuit made up of respective high and low band separation filters 54, 56 and Schmitt triggers 58, 60. This circuit separates each incoming tone signal into its two component nonharmonically related DTMF frequencies, one frequency within a high frequency tone group composed of frequencies 1209, 1336 and 1447 Hz, and the other within a low frequency tone group composed of frequencies 697, 770, 852 and 941 Hz. (In the example, frequency 1633 Hz is not used.) The tone separation process is accomplished by the high and low band separation filters 54, 56. The signals which respectively appear at the outputs of these filters appear as sine waves. These signals are transformed into square wave signals and amplitude limited by the high band and low band Schmitt triggers 58, 60. The signals which appear at the outputs of the Schmitt triggers thus constitute square wave signals of frequencies which fall within the high and low group tone frequencies set forth above. These square wave signals are respectively routed to the FH and FL inputs of a digital tone detector 62, to be described presently.

Figure 8B:
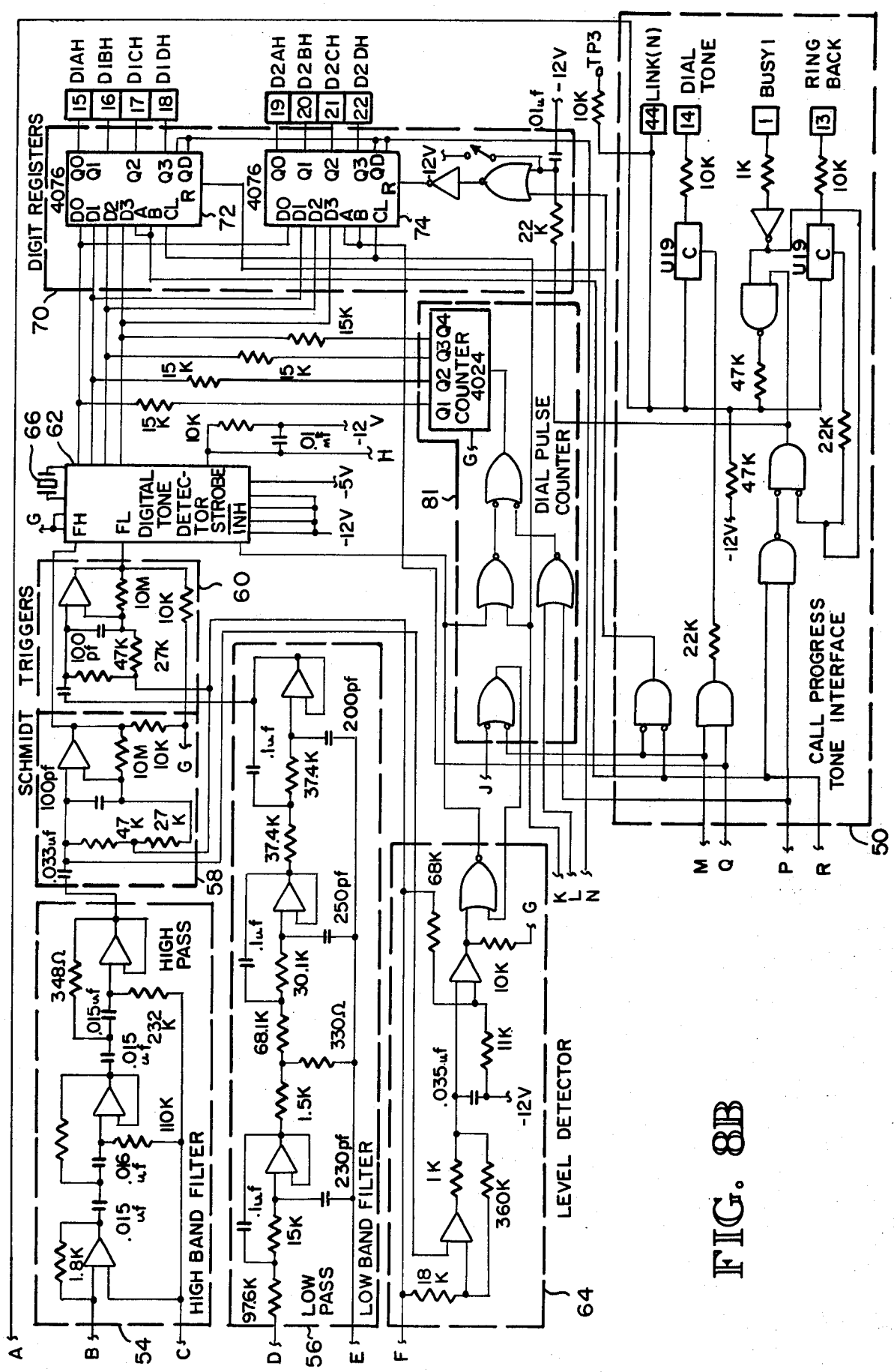
Figure 9:
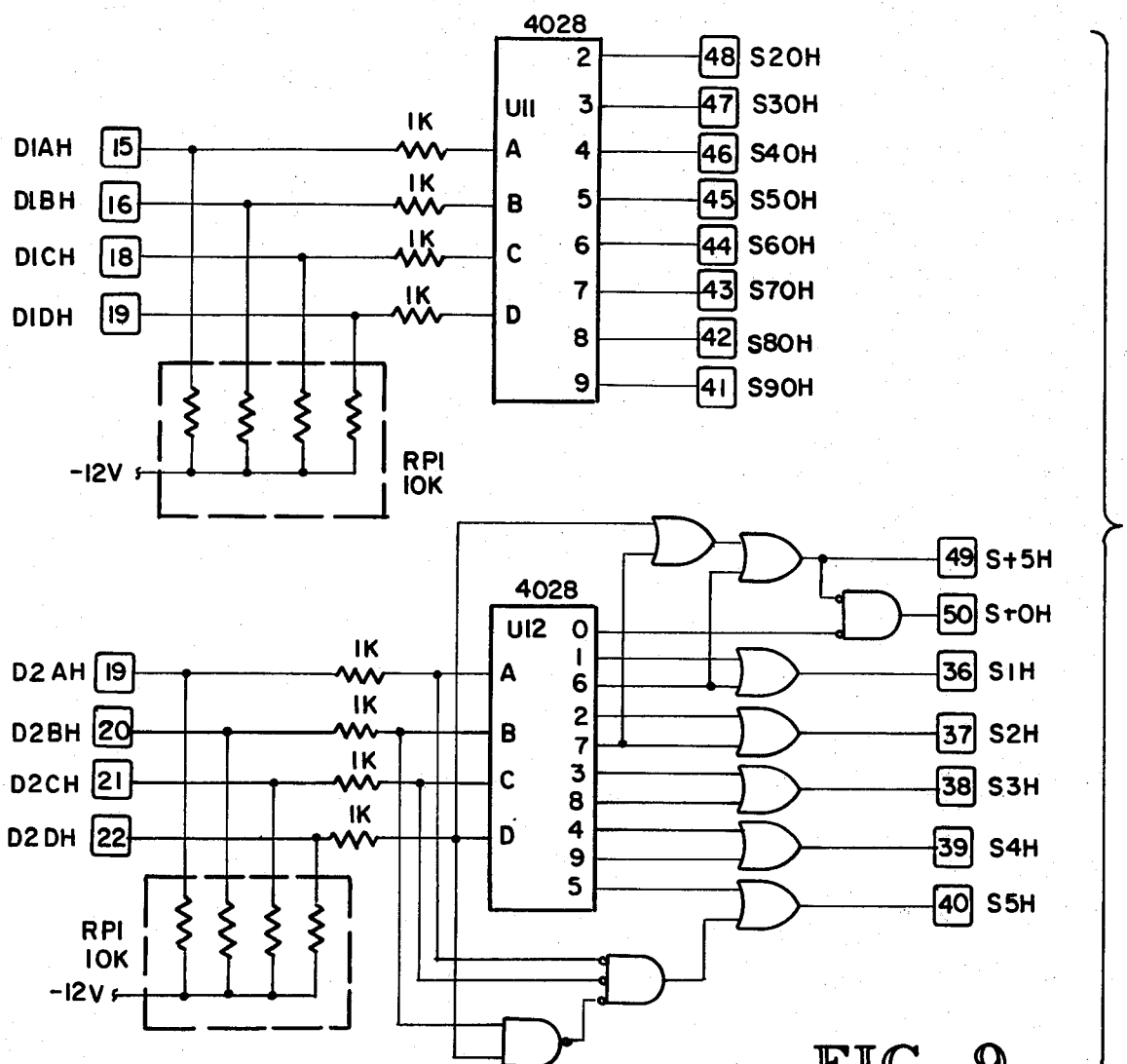
FIG. 9 is an electrical schematic of one preferred FIG. 3 ringing address decoder.
Figure 10:
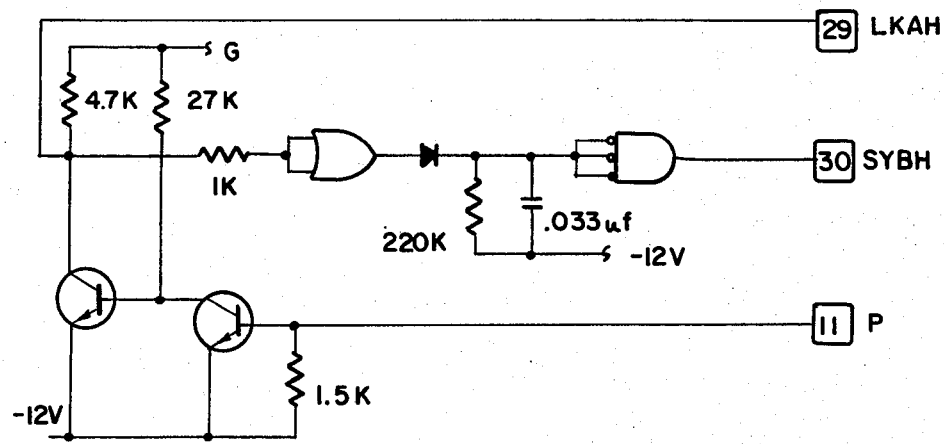
FIG. 10 is an electrical schematic of one preferred FIG. 3 system busy generator.
Figure 11:
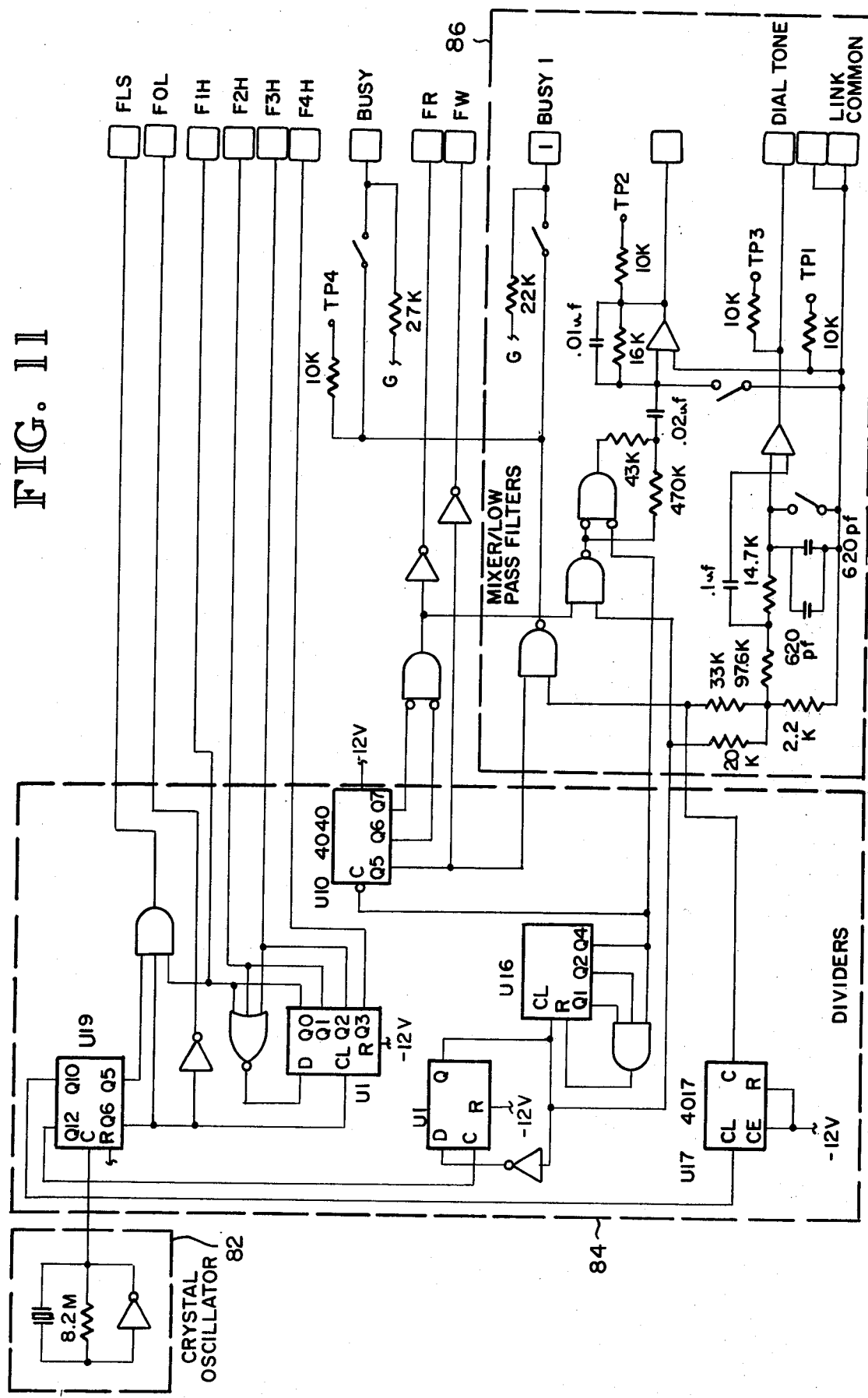
FIG. 11 is an electrical schematic of one preferred FIG. 3 divider and mixer/low pass filter.

In a preferred circuit construction illustrated in FIG. 8B, the high and low band separation filters are made up of respective three cascaded, two-pole, high pass sections which provide appropriate response drops and midband gains without attenuation. A digital tone detector 62 accepts the group-filtered and squared DTMF frequencies which appear at inputs FH and FL and converts them to appropriate output data in a predetermined time period. Out-of-tolerance frequencies are rejected, as are the first few cycles of each incoming tone signal in order to prevent errors in detection due to transients from the push-button telephone at the calling station. The incoming tone signal is then analyzed several times by correlation circuitry to determine whether it is comprised of a valid tone pair. Once the incoming signal is accepted as valid, the detector produces a negative going strobe pulse. Once this correlation process is accomplished and an incoming tone signal is accepted as valid, the detector will ignore any further change in incoming tone frequency until silence is detected, or until either the high group or low group incoming tone signal disappears for more than a predetermined time period. At the end of silence (or when sound is beginning), the detector is reset and will be ready to accept and detect another incoming tone signal representative of another decimal digit constituting appropriate station address information. In the example, the detector will not repeat a given detection routine until end of silence. Appropriate silence detection which initializes this reset function is provided by a level detector circuit 64.

One preferred digital tone detector measures the frequency of the incoming tone signals by counting internally generated clock pulses provided by oscillator 66 (FIG. 8B) during respective time periods corresponding to the period of selected successive square wave cycles of both signals presented at its FH and FL inputs. That is, the detector measures the time period between alternate zero crossings of selected successive square wave cycles of both signals. The clock pulses generated by oscillator 66 therefore are of a predetermined frequency substantially greater than the maximum tone frequency of incoming tone signals contained within the high frequency tone group. Internal discriminating circuitry counts the number of clock pulses within each cycle and determines if the incoming tone signal is within a certain frequency range based upon established clock count bands which correspond to the recognition band width limits of the DTMF tones to be detected. Digital correlation circuits in the form of individual up-down counters respectively associated with the DTMF tone frequencies distinguish valid tone pairs from noise, speech or other voice frequency signals which do not correspond to the desired DTMF frequencies. These counters count the number of valid detections accomplished by the detector by incrementing the counter associated with the detected frequency and simultaneously decrementing all remaining counters. When a particular up-down counter reaches a predetermined count, the detector thereupon determines that a valid detection has taken place. At that time, the data and strobe output signals appear at the detector outputs. If this condition does not occur before an expiration of an internally generated timing function, data will appear at the detector data output; but the strobe pulse does not appear. In the example, the detector includes seven data outputs which are normally high or logic 1 and which drop to a logic 0 state to assert the data. The various input and output signals indicated in FIG. 1 and the relationship to the remaining illustrated circuitry are described hereinafter in additional detail. One digital multi-frequency tone detector suitable for use in this invention is the CRC 8030 telephone DTMF Receiver, Rockwell International, Collins Hybrid Microelectronics.

The FIG. 2 level detector circuit 64 establishes a low or logic 0 signal at one input of a gate 68 as long as the amplitude of the signals which appear at the output of the high band separation filter exceeds a predetermined threshold level. This condition, of course, takes place during receipt of each incoming tone signal. A logic 1 signal thereupon appears at the output of gate 68 and is routed to the not inhibit ($\overline{INH}$) input of the tone detector. The detector is thus enabled for detecting any DTMF tones which appear at its FH and FL inputs. The level detector thus initializes the tone detector on the basis of silence as represented by the absence of any signal above the predetermined threshold level. The level detector further determines when silence has ended (or sound is beginning) in order to enable the detector in preparation for a detection sequence. In the FIG. 8B circuit, the level detector is comprised of a precision rectifier which generates a DC voltage proportional to the peak of the output signal from the high band separation filter, together with a comparater which yields the desired output signal whenever the rectifier voltage falls below a predetermined reference voltage.

Still referring to FIG. 2, a digit register 70 is connected to the data outputs of the digital tone detector 62. Register 70 includes, as illustrated in FIG. 8B, a 4-bit tens register 72 and a 4-bit units register 74 which yield respective BCD outputs at pins D1AH-D1DH and D2AH-D2OH. The call sequence state control logic 35 controls into which digit register the tone detector input data is loaded in accordance with the call sequence of incoming signals and is advanced from its first or tens digit state to its second or units digit state in response to the tone detector strobe pulse. Upon loading of the second digit into the units register 74, the call sequence state control logic 48 disables the tone detector by applying an appropriate binary signal at its $\overline{INA}$ input via gate 68. Detector 62 thereafter will remain disabled until re-enabled at a later time by the logic circuit 48.

Figure 3:
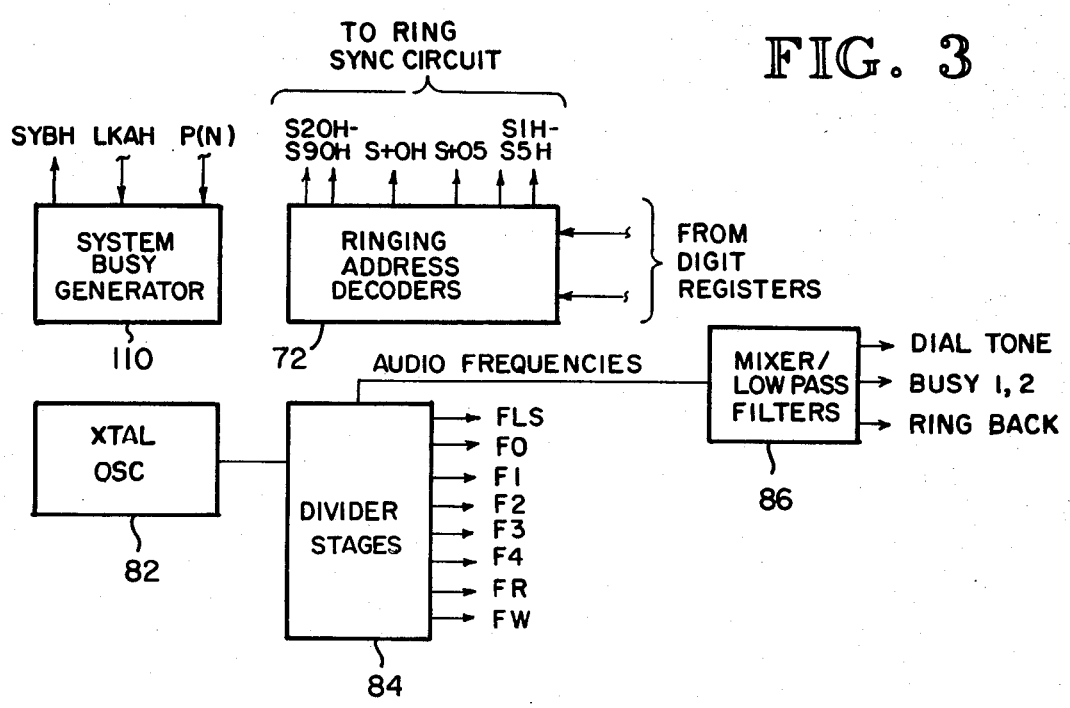
FIG. 3 is a block diagram of the FIG. 1 signal circuit and address decoder.

The BCD signals which appear at the eight outputs of the FIG. 2 digit register 70 are routed to the inputs of the FIG. 3 ringing address decoders 72 which convert the two digit BCD code into a binary address signal which corresponds to the address of the called station. The address signal is composed of three binary output signals which appear on three groups of output leads, respectively. In the example of FIG. 2, these groups of leads are labeled SXXH, S+XH and SYH where SX=20, 30, 40, 50, 60, 70, 80, 90; X=0, 5 and Y=1, 2, 3, 4, 5. That is, the SXXH leads correspond to the tens digit, the SYH leads correspond to unit digits from 1 to 5, and the S+XH leads indicate whether the units digits which appear on the SYH leads are between digits 1 and 5 or 6 and 0 (low group or high group), as the case may be.

The address signal which appears at the outputs of the ringing address decoders is routed back to the ring synchronization circuits associated with all stations serviced by the FIG. 1 system in TDM form. The ring synchronization circuit associated with the called station, however, is the only synchronization circuit which will respond to the unique station address signal presented. The called station ring synchronization circuit thereupon determines on which link the station is being called by identifying in which TDM time slot the station address data appears and synchronizes therewith. The called station ring synchronization circuit thereupon routes a signal to a ringing logic circuit 76 and the lamp control logic 37. Circuit 76 combines the signal from the ring synchronization circuit with a clock signal FR to operate a signalling relay 70 which applies one of two selectable voltages as indicated, depending upon the position of selector switch A/S, to the B lead connected to the called station ring-out device for operating it at a predetermined frequency. Circuit 37 combines the signal from the ring synchronization circuit with clock signal FW for operating the station lamp at a predetermined flash rate. The called station ring synchronization circuit additionally routes a signal to the called station link scanner to prevent it from scanning for an available link, and applies a binary low signal on bus RAKL in the appropriate time slot. The RAKL signal is routed via the RAKL bus to the demultiplexer 46 associated with the seized link selector circuit and is converted to a signal level RAK. Level RAK is presented to a second input of the call sequence state control logic circuit 48 for advancing it to its third or ringing logic state. The RAK signal level thus indicates that the calling station ring synchronization circuit is being rung. The call sequence state control logic circuit thereupon causes ring back tone to be applied to the seized link by operating the call progress tone interface 50. The calling party therefore is notified that the called station is now being rung. The ring synchronization circuit and remaining components of the station circuit associated with the called station will remain in the aforementioned operational mode until the party at the called station takes the telephone set off-hook.

At that instant, the called station off-hook detector 30 generates an off-hook signal which is routed to its off-hook timer 32. Upon validation as a valid off-hook signal, the off-hook timer routes an off-hook signal to the called station ring synchronization circuit which operates the called station link scanner circuit such that it will be addressed to the siezed link. The called station link scanner circuit now places a binary low signal on the LKAH lead in the appropriate TDM time slot and actuates the link switch associated with the seized link to connect the telephone set at the calling station with the seized link. Consequently, the calling station and the called station telephone sets now are both connected to the same audio talk path. The ring synchronization circuit now removes the binary low on the RAKL bus, in response to which the call sequence state control logic of the link selector associated with the seized link clears digit register 70. The outputs of the digit register now go to zero during the time slot associated with the seized link and, hence, cause the address signal to be removed during that time slot from all ring synchronization circuits.

In the event the called station is busy at the time the station address data is presented to its ring synchronization circuit from the ringing address decoders, its ring synchronization circuit will ignore the incoming station address information but will route an output signal to the called station lamp control logic 37. The lamp control logic thereupon causes lamp driver 39 to flash the telephone set lamp via lead L at an appropriate flash rate to indicate that the called station is being called despite the fact that the called station user is on another line. In this event, however, the called station ring synchronization circuit does not route a control signal to the ringing logic circuit so that the ring-out device associated with the called station is not operated.

In the event the calling telephone station is equipped with rotary dial telephone set, dial pulse signals are detected by the off-hook detector 30 and are passed through the off-hook timer 32, the off-hook timer having a response time which is greater than the period of each dial pulse. The dial pulses are transmitted from timer 32 to the link scanner 36 and are transmitted along bus DPL in TDM form to the link control signal demultiplexer 46 associated with the seized link. The level signal DPL which appears at the DPL output demultiplexer 46 corresponds to the incoming dial pulse signals which are detected by the station circuit off-hook detector. This signal is transmitted along lead DPL from the demultiplexer to the input of a dial pulse descriminator circuit 80 and thence to a dial pulse counter 81. The dial pulse descriminator circuit verifies that the pulse signals received correspond to valid dial pulses by determining whether the period of the pulses exceed a predetermined minimum time period. In the event the pulses are verified as valid by the dial pulse descriminator, it applies an appropriate signal to the digit register 70 for causing the BCD count now contained in the dial pulse counter 81 to be loaded into the appropriate 4-bit register. Additionally, the descriminator 80 notifies the call sequence state control logic circuit that the first digit has been received and thereby causes the logic circuit to advance its logic state in preparation for receipt of dial pulses corresponding to the second decimal digit of a two digit station address. All signals corresponding to the second digit are received in the generally similar manner, multiplexed across the DPL lead, demultiplexed, counted and loaded into the appropriate 4-bit register, as in the case of the first digit.

Referring to FIG. 3, the system control signals are generated by an oscillator 82 composed of a crystal oscillator which operates at an appropriate frequency, for example 3.579545 MHz. The output of the oscillator is fed to a plurality of divider stages 84 which divide down the oscillator frequency into a number of different clock signals depicted in FIG. 13. Among the clock signals generated by the divider stages are: signals $F_1$-$F_4$ which, as already mentioned, constitute the link clock frequencies; signal FO, the basic clock frequency which is utilized in the link scanner and ring synchronization circuits to synchronize with signals RAKL, LKAH and DPL; signal FLS, a signal utilized in the link scanner circuits as a marker to tell those circuits on which link they are operating with respect to link 1, and to control the outputs of the link scanner circuits to provide four level outputs for operating the four link switches, respectively; signal FR, a signal utilized to control the ringing logic circuit to provide an appropriate interrupted ringing rate; and signal FW, utilized to control the lamp control logic to provide a desired lamp flash rate. Further divisions of the oscillator frequency are provided to obtain signals of selected audio frequencies, the latter signals being passed through mixer/low pass filters 86 of appropriate design to obtain audio call progress signals. The primary call progress signals obtained are dial tone, busy tone, audible ring-back. The audio frequencies are generated digitally as square waves, then are mixed and filtered by the filter circuits 86 to generate precision sinusoidal wave forms. Busy 1 and busy 2 signals are constituted by the same signal but are brought out at different locations. The busy 1 signal is applied to the link selector circuits at their respective call progress tone interfaces to place busy tone on their respectively associated links in the event the called station does not return a RAKL signal when it is being addressed by the address decoder. Busy 2 is transmitted to all station circuits and is used only when a system busy condition is in effect when all links are in use.

In the FIG. 1 system, the four talk paths constituted, respectively, by LINK 1-LINK 4 are single-ended unbalanced talk paths which provide bidirectional communication between at least two stations simultaneously connected therewith. In the example, the talk paths constituted by LINK 1-LINK 4 are formed by hard wire conductors. The talk path from a calling station to a called station serviced by the FIG. 1 system is constituted by the exterior tip ring leads of the calling station telephone set, the tip ring termination circuit 31, the link switch, the hard wire link circuit, and the reverse counterpart components of the called station, namely its link switch, tip ring termination circuit and exterior tip ring leads. Consequently, the FIG. 1 system is well protected and does not suffer from cross talk problems which would otherwise be associated with long runs of station cable.

Figure 4:
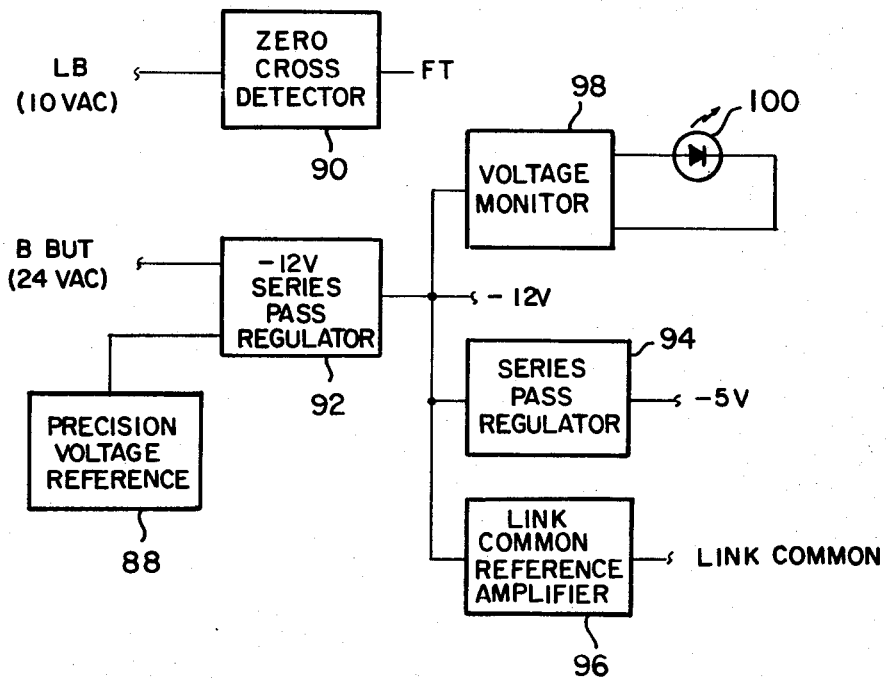
FIG. 4 is a block diagram of the FIG. 1 power supply circuit.
Figure 5:
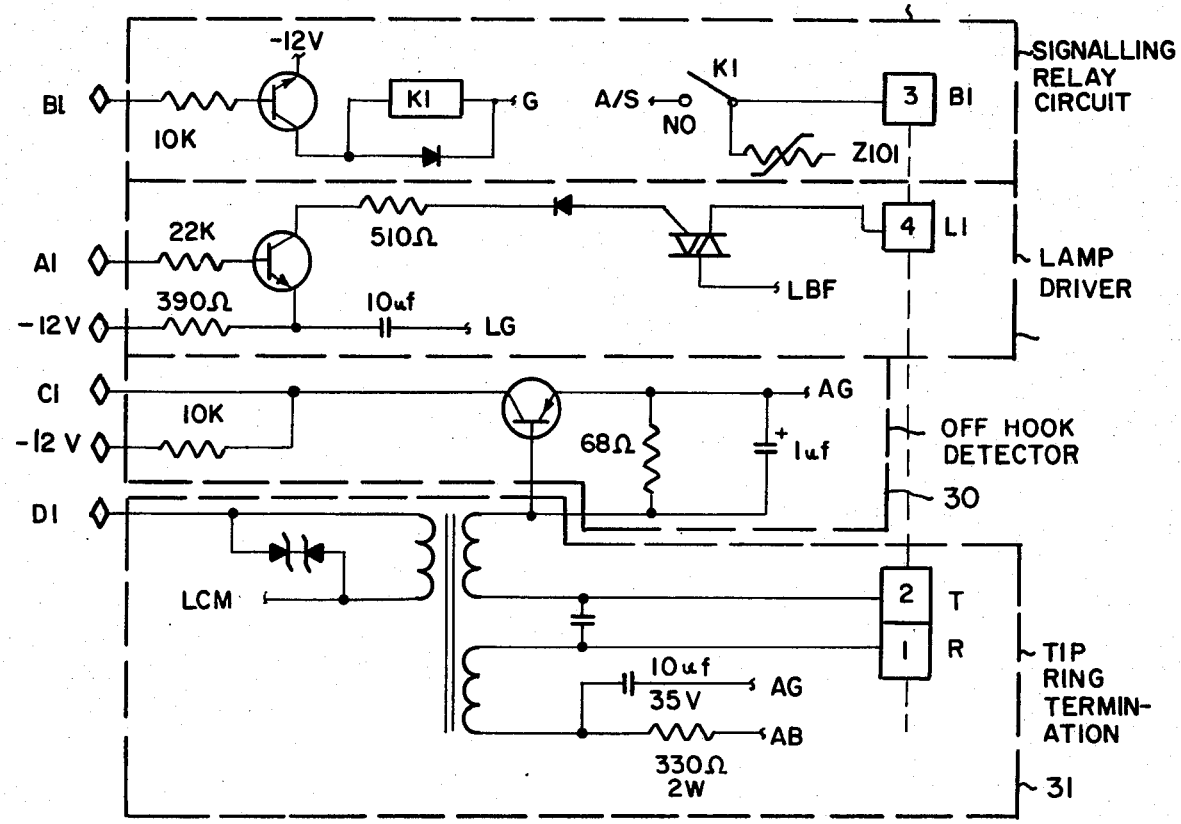

Referring now to FIG. 4, the power supply circuit illustrated in generalized block diagram form in FIG. 1 is illustrated in additional detail. The FIG. 4 power supply circuit includes a precision voltage regulator 88 and a zero cross detector 90. The zero cross detector takes power which is utilized to drive the lamps in the station sets and generates a signal referenced FT at every zero crossing of the AC voltage signal. Refer to the FIG. 13 timing diagram. Signal FT is applied to and used by the lamp control logic to fire a triac Q101 (FIG. 7) which is used to turn the station set lamps on and off. It is possible, by using a zero cross detector, to minimize the amount of power needed to turn the lamps on and off because the triac, once turned on, will remain on until the AC wave form effects the next succeeding zero crossing. Consequently, it is not necessary to maintain a constant on voltage for driving the station set lamps. The illustrated circuit construction further generates less noise because the lamp triacs are fired when the voltage is at a minimum.

The regulator circuit receives unregulated B battery voltage between 19 and 30 volts and generates three voltages which are utilized by the system. The regulator generates a temperature compensated internal voltage reference of −12 volts. This reference voltage is utilized by three regulators, the first being a series pass regulator 92 made up of a series pass amplifier and a reference component depicted in FIG. 12. A −5 volt series pass regulator 94 receives the output from the series pass regulator and produces a −5 volt voltage. A link common reference amplifier 96 receives the −12 volt signal from the series pass regulator and provides a low current link common which is applied to the system audio circuits. A voltage monitor 98 monitors the voltage on the voltage output from the series pass regulator and, in the event it drops below a predetermined value such as 9 volts, will activate a LED indicator 100. A preferred power supply circuit is illustrated in further detail in FIG. 12.

CONFERENCING

When two stations are connected to a common link, it is possible to connect additional stations to that link for conferencing. This is accomplished by applying a switch hook flash to the DPL bus. Switch hook flash is constituted by a single open on the tip ring terminal which is of a time duration greater than about 50 msec up to about 200 msec. When this type of signal is applied to the DPL lead, the dial pulse descriminator 80 determines that the signal does not correspond to a valid rotary dial pulse digit and therefore does not implement the pulse counting function. The dial pulse descriminator, however, routes an appropriate signal to the call sequence state control logic circuit 48 which causes it to advance one state in its call sequence. Consequently, with two parties already accessed to a particular link, one of those parties, by initiating an appropriate switch hook flash, will cause the call sequence control logic to advance to the state in which it is prepared to receive station address information in the form of appropriate touch tone or dial pulse signals. In this instance, the call sequence control logic circuit will effect the same sequence of operations as described hereinabove with respect to seizure of and access to a particular link by a calling party, followed by ring-out at the called station. In this instance, when the called station answers by assuming off-hook status, that station will be connected with the same link as the previous calling and called stations, thereby establishing a three-way conference call. This procedure can be repeated to add any number of stations to the same link.

The switch hook flash function just described additionally is operative regardless of which state the call sequence state control logic circuit is in at the time the switch hook flash is effected. Consequently, the call sequence state control logic circuit may be advanced from its idle state to its first digit state, from the first digit state to the second digit state, from its second digit state to ring-out state, or from the ring-out state back to idle state, merely by effecting appropriate switch hook flashes. Consequently, in the event the party to be added to the conference is busy, the switch hook flash operation of the invention enables the calling party to advance the call sequence state control logic circuit back to its idle state to resume the original conversation, or to repeat a new dialing sequence in an effort to add a different called party to the conversation.

Still referring to FIG. 2 of the drawings, a long flash timer 90 also receives the DPL signal which appears at the output of the link control signal demultiplexor. When one party of a two or more party conversation returns to on-hook status, a switch hook flash signal appears at the DPL output of the demultiplexor. The off-hook timer in the station control (FIG. 1) of that station removes the DPL signal upon expiration of a one second time period. Consequently, the signal which appears at the DPL output of the demultiplexor appears as a flash having a duration in excess of the 750 msec maximum dial pulse. The long flash timer circuit determines that this signal condition does not constitute a switch hook flash and therefore applies a signal to the call sequence state control logic circuit which prevents it from advancing to the next logic state. Thus, in a conference call situation, if one of the parties to the conference returns to on-hook status, leaving the remaining parties to the conference in communication on the seized link, the call sequence state control logic circuit will remain in the same state.

SYSTEM BUSY

A system busy generator 113 (FIG. 3) senses the data present on bus LAKH during all time periods associated with the TDM data signals present thereon. In the event the data present on that bus corresponds to a binary low during all time periods, indicative that all links are in use or have been seized, the system busy generator produces a system busy signal which appears on lead SYBH. This signal is routed to all station lamp control logic circuits 37 to cause all station set lamps to light steadily in order to indicate that the entire intercom system composed of all four communication links is in use. The system busy signal is also routed to a system busy tone circuit 112 (FIG. 2) associated with station circuit. Each circuit 112 is responsive to signal SYBH to prevent link seizures while applying a busy tone produced by the signal $Busy^2$ at the tip ring termination 31.

The FIG. 3 system busy generator further receives a signal P(N) in the event one of the links is out-of-service when its link selector circuit is disconnected from the system. The signal P(N) is composed of the link TDM clock signal. When a link selector circuit is disconnected or nonexistent, the signal P(N) which is presented at the system busy generator appears as if the link associated with that circuit is busy or has been seized. The system busy generator will respond to presentation of that signal by applying a binary low to the link available bus LAHK to fill the time slot associated with the out-of-service link. Consequently, the FIG. 1 system may be utilized with less than the illustrated four links with the system busy generator producing an appropriate system busy indication with respect to any out-of-service link. With the system busy circuit in operation, of course, no station circuit will be permitted to access and connect its audio talk path to a link which is not equipped with a link selector.

CAMP-ON

To provide camp-on operation in the event a call is received at a station already off-hook, the ring synchronization circuit associated with that station routes a signal to its lamp control logic circuit which, in response thereto, causes the station set lamp to change from steady state to flashing at a predetermined flash rate, thereby notifying the subscriber at that station that a call is being received from and camped-on another link. The called station set lamp transition from steady state to flash mode thus constitutes a call-waiting indication. For the four link system illustrated, up to three calls can be camped-on simultaneously in this fashion, each of the additional calls being routed by a separate link. A busy tone is fed back to each calling party because the ring synchronization circuit of the called station control circuit does not return a RAKL signal. When the station at which a call is camped-on hangs up, a normal call sequence takes place. Upon resumption of on-hook status and validation by its off-hook timer that a valid on-hook condition exists, the ring synchronization circuit and link scanner circuits of that station are freed to receive a call which has been camped-on to that station. The ring synchronization circuit then synchronizes with the time slot associated with the link occupied by the camped-on calling station, generates an RAKL signal, and causes the station set ring-out device to be operated. The station which is the subject of camp-on can now resume off-hook status and communicate in the normal manner with the heretofore camped-on station. In the event more than one station is camped on to the called station, the camped-on stations will be randomly connected with the called station, depending upon when the called station off-hook timer releases the called station ring synchronization circuit with respect to the various time slots associated with the links on which the calling parties are camped. As long as each of the calling parties remains camped on and is receiving busy tone back, the link selector circuit associated with the link which that party has seized will continue to ring the called station, resulting in only a lamp flash thereat.

OFF-HOOK BUSY

An off-hook busy logic circuit 114, as illustrated in generalized block form in FIG. 1, receives signals from circuits 32 and 34, and transmits a return signal to circuit 34. A preferred off-hook busy logic circuit is illustrated in FIG. 7. Signals which appear on the BSY lead of the telephone set, the BSY lead being grounded whenever the hand set is off the switch hook cradle, are utilized to implement the off-hook busy function. The off-hook busy logic will, in response to detection of a ground of the BSY lead without seizure of the tip and ring leads T and R, transmit a signal to the respectively associated ring synchronization circuit to prevent it from initiating an audible ring-out. Consequently, if an intercom call is received while the off-hook busy condition is in effect, the calling party is placed in camp-on status until the hand set is returned to the switch hook cradle. In other words, the ground signal which appears at the BSY lead causes the station circuit to operate as if that telephone set is busy. A station equipped with off-hook busy logic provides the user with the option of disabling the ring-out device and relying solely on lamp flash to indicate an incoming call, regardless of whether or not the telephone set is in use or a key button is depressed. The same functions take place if the party is utilizing an outside line at the time the incoming call is received—the ring-out device will not operate and only the lamp will flash to indicate an incoming intercom call.

PAGING ACCESS

Referring now to FIG. 14, a modified form of the FIG. 1 system suitable for paging access service is illustrated. A system equipped with paging access utilizes generally similar circuitry as that illustrated in FIGS. 1 and 2, except that the FIG. 14 paging access circuit is substituted for the FIG. 2 station circuit. The FIG. 14 circuit enables a subscriber telephone set to be connected via an internal talking path provided by one of the FIG. 1 links to one of five audio output channels and a unique relay control which make the system compatible with external conventional paging circuitry not shown. The output channels preferably serve five paging zones, each provided with a 600 ohm balanced audio pair and dry contact closure. The FIG. 14 circuit includes a ring synchronization circuit 118, a link scanning circuit 120, four link switches, relay drivers 122, and a relay matrix 124 which is connected to five audio output channels. Five station address codes, S1H–S5H, are routed to the ring synchronization circuit to effect a connection between a talk path which has been seized by a calling station as described hereinabove with the relay matrix via appropriate transformer coupling 126. Matrix 124 is controlled by drivers 122 on the basis of the station code which is presented to the ring synchronization circuit such that the seized link can be connected via the coupling 126 and relay matrix 124 to one of the five audio output channels.

OUTSIDE LINE CONFERENCING

Referring now to FIG. 15 of the drawings, to provide outside line access, an outside line access circuit may be provided. The FIG. 15 circuit connects a station telephone set via a link switch, which is actuated by the link scanner circuit as explained hereinabove, to a balanced tip-ring pair T, R. The outside line access circuit is responsive to the signal condition present in the A lead and lamp lead L of the telephone set. A lamp state detector 128 produces an output signal whenever a lamp flashing signal is present on the lead L and similarly an A lead state detector 130 produces a corresponding signal when an open signal is present on the A lead. The signals from the lamp state and A lead state detectors are presented to the ring synchronization circuit 132 which, in response to simultaneous presentation of such signals, will deliver an appropriate signal to the link scanner circuit for connecting with the link which has been seized by a calling station to permit outside line access. The link or talk path seized by the calling station now will be connected to the outside line tip and ring terminals T and R. The ring synchronization circuit 132 routes an additional signal to a relay sequence logic circuit 136 which controls relays $K_1$ and $K_2$ connected, respectively, in the ring lead R and between the A and A COMM leads, as shown (FIG. 15). Relay $K_1$ is closed by the relay sequence logic to close the outside line talk path while simultaneously therewith relay $K_2$ is closed in order to ground the A lead. Consequently, the calling station is permitted to seize only those outside lines which have been placed on hold. This prevents subscribers from accessing outside lines merely by dialing the outside line access code.

Although one preferred embodiment of the invention has been illustrated and described herein, variations will become apparent to one of ordinary skill in the art. Accordingly, the invention is not to be limited to the specific embodiment illustrated and described herein and the true scope and spirit of the invention are to be determined by reference to the appended claims.

The embodiments of the invention in which an exclusive property or privilege is claimed are defined as follows:

1. A communication system for providing communication between a plurality of stations, the system comprising: means providing a plurality of communication links; a plurality of station circuits respectively operable with separate stations, each said station circuit including link scanner means for seizing an available link, and effecting a connection with a seized link; and a plurality of link selector circuits respectively associated with separate links, each said link selector circuit including means responsive to seizure of its associated link by a calling station link scanner for causing a called station link scanner to effect connection with the link seized by the calling station link scanner.

2. The system of claim 1, including means for transmitting a control signal between said station circuits and said link selector circuits along a common time division multiplexed communication path wherein data may appear in discrete time slots which correspond, respectively, to said links.

3. The system of claim 1, including means operatively associated with each said link scanner means for transmitting a control signal between said station circuits and said link selector circuits along a common time division multiplexed communication path wherein data indicative of link availability may appear in discrete time slots which correspond, respectively, to said links.

4. The system of claim 3, wherein each said link scanner means include means responsive to the appearance of data indicative of link availability in one time slot for causing data indicative of link seizure to appear in said one time slot, and wherein each said link selector circuit includes means responsive to the appearance of data indicative of link seizure in the time slot corresponding to its associated link for transmitting an audible signal to a calling station associated with said link scanner means along that link, and means for receiving and decoding station address information transmitted from the calling station along that link.

5. The system of claim 4, including means responsive to the appearances of data indicative of link seizure in all time slots for effecting system busy indication.

6. The system of claim 4, including address decoder means for transmitting a decoded station address signal from said link selector circuits to said station circuits along a time division multiplexed communication path wherein said decoded station address data appears in a time slot which corresponds to the seized link.

7. The system of claim 6, wherein each said station circuit includes a ring synchronizing circuit including means responsive to unique decoded station address data for identifying the seized link on the basis of the time slot in which said unique decoded station address data appears, and means for causing the link scanner means associated therewith to effect a connection with the seized link identified.

8. The system of claim 7, wherein each said station circuit further includes a plurality of link switches respectively associated with said links and operative by said link scanner means to selectively connect said links to a telephone set talk path.

9. The system of claim 7, including means operatively associated with each said ring synchronizing circuit for transmitting a control signal from said station circuits to said link selector circuits along a common time division multiplexed communication path wherein data indicative of ring acknowledgement may appear in discrete time slots which correspond, respectively, to said links.

10. The system of claim 9, wherein each said link selector circuit further includes means responsive to the appearance of data indicative of ring acknowledgement in the time slot corresponding to its associated link for transmitting an audible signal to the calling station along that link.

11. The system of claim 1, wherein each said link selector circuit includes dial pulse decoder means and tone decoder means for decoding dial pulse encoded station address signals and tone encoded station address signals, respectively, transmitted from a calling station associated with said link scanner means along a seized link, and register means for alternately registering a station address decoded by said dial pulse decoder means and by said tone decoder means.

12. The system of claim 11, wherein each said link selector circuit includes call sequence state control logic means advancable to successive logic states in response to transmission of a predetermined signal from the calling station for controlling operation of said dial pulse decoder means, said tone decoder means and said register means.

13. The system of claim 1, including means for simultaneously operating a ring-out device and a lamp located at a called station associated with said link scanner means when the called station is free to accept an intercom call, and means for only operating a lamp located at the called station when the called station is busy.

14. The system of claim 13, including off-hook busy logic means connectable with a telephone set having a hand set and a switch hook cradle for permitting lamp operation only when the hand set is off the switch hook cradle.

15. The system of claim 1, including paging access means for accessing the link seized by a calling station associated with said link scanner means to an audio output channel.

16. The system of claim 15, wherein said paging access means include a relay matrix coupled to a plurality of link switches respectively associated with said links, a link scanner circuit adapted to selectively operate said link switches to connect said links to an audio output channel, and a ring synchronization circuit responsive to a station address code routed from a calling station for causing said link scanner circuit to operate the link switch associated with the seized link.

17. The system of claim 1, including outside line conferencing means for accessing a link seized by a calling station associated with said link scanner means to an outside telephone line which is on hold.

18. The system of claim 17, means connectable with a telephone set lamp lead for detecting a lamp flashing signal thereon, means connectable with a telephone set lead for detecting an open signal thereon, a plurality of link switches respectively associated with said links, a link scanner circuit adapted to selectively operate said link switches to connect said links to an outside telephone line, a ring synchronization circuit responsive to simultaneous detection of the lamp flashing signal and lead open signal for causing said link scanner circuit to operate the link switch associated with the seized link, and means connected with said ring synchronization circuit for closing the outside telephone line talk path and grounding the lead upon operation of the link switch associated with the seized link.

19. The system of claim 1, including a power supply comprising a triac for driving lamps located at the stations, a zero crossing detector connectable with an alternating current power source for firing said triac, and means providing at least one regulated voltage.

20. A multi-link telephone communication system for providing communication between a plurality of telephone stations, the system comprising: means providing a plurality of communication links; a plurality of link scanners respectively operable with separate telephone stations; a plurality of link selectors respectively associated with separate links; and means providing time division multiplexed communication between said link scanners and said link selectors; each said link scanner including means for seizing an available link, and effecting a connection with a seized link; each said link selector including means responsive to presentation of a time division multiplexed signal indicative of seizure of its associated link for decoding station address information transmitted along that link from a calling station, and presenting a decoded station address signal for time division multiplexed transmission to the link scanner associated with a called telephone station to effect connection with that link.

* * * * *

UNITED STATES PATENT AND TRADEMARK OFFICE
CERTIFICATE OF CORRECTION

PATENT NO. : 4,188,511

DATED : February 12, 1980

INVENTOR(S) : Maurice I. Smith et al.

It is certified that error appears in the above-identified patent and that said Letters Patent are hereby corrected as shown below:

Column 16, line 55, insert -- means for -- after "and".

Column 18, line 30, insert -- including -- between "17," and "means".

Column 18, line 59, insert -- means for -- between "and" and "effect -".

*Signed and Sealed this*

*Twenty-second* Day of *July 1980*

[SEAL]

Attest:

SIDNEY A. DIAMOND

Attesting Officer

Commissioner of Patents and Trademarks